US010218647B2

(12) United States Patent
Wang et al.

(10) Patent No.: US 10,218,647 B2
(45) Date of Patent: Feb. 26, 2019

(54) MECHANISM TO SUPPORT MULTIPLE-WRITER/MULTIPLE-READER CONCURRENCY FOR SOFTWARE FLOW/PACKET CLASSIFICATION ON GENERAL PURPOSE MULTI-CORE SYSTEMS

(71) Applicants: Ren Wang, Portland, OR (US); Christian Maciocco, Portland, OR (US); Namakkal N. Venkatesan, Hillsboro, OR (US); Tsung-Yuan C. Tai, Portland, OR (US)

(72) Inventors: Ren Wang, Portland, OR (US); Christian Maciocco, Portland, OR (US); Namakkal N. Venkatesan, Hillsboro, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 14/960,993

(22) Filed: Dec. 7, 2015

(65) Prior Publication Data
US 2017/0163575 A1 Jun. 8, 2017

(51) Int. Cl.
*H04L 12/861* (2013.01)
*H04L 12/721* (2013.01)
(Continued)

(52) U.S. Cl.
CPC .......... *H04L 49/9094* (2013.01); *H04L 45/38* (2013.01); *H04L 45/54* (2013.01); *H04L 45/7453* (2013.01)

(58) Field of Classification Search
None
See application file for complete search history.

(56) References Cited

U.S. PATENT DOCUMENTS

| 6,724,721 B1 | 4/2004 | Cheriton |
| 2008/0005737 A1* | 1/2008 | Saha ..................... G06F 9/3004 718/100 |

(Continued)

OTHER PUBLICATIONS

Zhou et al. ("Scalable, High Performance Ethernet Forwarding with Cuckooswitch"), Dec. 2013.*
Office Action received for U.S. Appl. No. 14/750,921, dated Dec. 19, 2016, 5 pages.
International Search Report and Written Opinion received for PCT Patent Application No. PCT/US2016/060783, dated Feb. 6, 2017, 15 pages.

(Continued)

*Primary Examiner* — Christopher M Crutchfield
*Assistant Examiner* — Thinh D Tran
(74) *Attorney, Agent, or Firm* — Law Office of R. Alan Burnett, P.S

(57) ABSTRACT

Methods and apparatus to support multiple-writer/multiple-reader concurrency for software flow/packet classification on general purpose multi-core systems. A flow table with rows mapped to respective hash buckets with multiple entry slots is implemented in memory of a host platform with multiple cores, with each bucket being associated with a version counter. Multiple writer and reader threads are run on the cores, with writers providing updates to the flow table data. In connection with inserting new key data, a determination is made to which buckets will be changed, and access rights to those buckets are acquired prior to making any changes. For example, under a flow table employing cuckoo hashing, access rights are acquired to buckets along a full cuckoo path. Once the access rights are obtained, a writer is enabled to update data in the applicable buckets to effect entry of the new key data, while other writer threads are prevented from changing any of these buckets, but may concurrently insert or modify key data in other buckets.

28 Claims, 13 Drawing Sheets

(51) Int. Cl.
*H04L 12/743* (2013.01)
*H04L 12/741* (2013.01)

(56) References Cited

U.S. PATENT DOCUMENTS

| | | | | |
|---|---|---|---|---|
| 2009/0133023 | A1* | 5/2009 | Li | G06F 9/526 |
| | | | | 718/102 |
| 2011/0110380 | A1* | 5/2011 | Muller | G06F 13/28 |
| | | | | 370/412 |
| 2014/0328180 | A1 | 11/2014 | Kim et al. | |
| 2014/0337593 | A1* | 11/2014 | Holbrook | G06F 3/0614 |
| | | | | 711/162 |
| 2015/0120687 | A1* | 4/2015 | Bhattacharjee | G06F 17/30362 |
| | | | | 707/704 |
| 2015/0286586 | A1* | 10/2015 | Yadav | G06F 9/528 |
| | | | | 711/152 |

OTHER PUBLICATIONS

Dice, et al., "Lightweight Contention Management for Efficient Compare-and-Swap Operations", Proceedings of the 19th international conference on Parallel Processing, 2013, 25 pages.
Herlihy, "Wait-Free Synchronization", ACM Transactions on Programming Languages and Systems, vol. 11, No. 1, Jan. 1991, pp. 124-149.
Intel, "Intel® 64 and IA-32 Architectures Software Developer Manuals", retrieved from web on Feb. 15, 2016, 6 pages.
Intel, "Intel® Data Plane Development Kit (Intel® DPDK) Overview Packet Processing on Intel® Architecture", Communications Infrastructure Division, Dec. 2012, 35 pages.
Suhane, et al., "Performance Analysis of Backoff Algorithm in IEEE 802.11 Networks", International Journal of Scientific & Engineering Research, vol. 2, Issue 6, Jun. 2011, pp. 58-61.
Zhou, et al., "Scalable, High Performance Ethernet Forwarding with Cuckooswitch", CoNext'13, Dec. 2013, 12 pages.

* cited by examiner

MECHANISM TO SUPPORT MULTIPLE-WRITER/MULTIPLE-READER CONCURRENCY FOR SOFTWARE FLOW/PACKET CLASSIFICATION ON GENERAL PURPOSE MULTI-CORE SYSTEMS

CROSS-REFERENCE TO RELATED APPLICATIONS

The present application contains subject matter related to U.S. application Ser. No. 14/750,921, entitled TECHNOLOGIES FOR CONCURRENCY OF CUCKOO HASHING FLOW LOOKUP, filed on Jun. 25, 2015. Both applications are subject to assignment to INTEL® Corporation.

BACKGROUND INFORMATION

Access to computer networks has become a ubiquitous part of today's computer usage. Whether accessing a Local Area Network (LAN) in an enterprise environment to access shared network resources, or accessing the Internet via the LAN or other access point, it seems users are always logged on to at least one service that is accessed via a computer network. Moreover, the rapid expansion of cloud-based services has led to even further usage of computer networks, and these services are forecast to become ever-more prevalent.

Networking is facilitated by various types of equipment including routers, switches, bridges, gateways, and access points. Large network infrastructure typically includes use of telecommunication-class network elements, including switches and routers made by companies such as Cisco Systems, Juniper Networks, Alcatel Lucent, IBM, and Hewlett-Packard. Such telecom switches are very sophisticated, operating at very-high bandwidths and providing advanced routing functionality as well as supporting different Quality of Service (QoS) levels. Private networks, such as Local area networks (LANs), are most commonly used by businesses and home users. It is also common for many business networks to employ hardware- and/or software-based firewalls and the like.

To facilitate communications between networks and computing devices that access such networks, networks typically include one or more network devices (e.g., a network switch, a network router, etc.) to route communications (i.e., network packets) from one computing device to another based on network flows, which are stored in a flow lookup table. Traditionally, network packet processing (e.g., packet switching) has been performed on dedicated network processors of the network devices.

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, I/O ports, etc. Under one virtualized approach using Virtual Machines (VMs), the physical hardware resources are employed to support corresponding instances of virtual resources, such that multiple VMs may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications, network service providers can gain flexibility in network configuration, enabling significant benefits including optimization of available bandwidth, cost savings, and faster time to market for new services. Moreover, SDNs' support of software-based network packet processing has resulted in network infrastructures that support network packet processing being performed on network devices with general purpose processors, thereby increasing scalability, configurability, and flexibility.

Typically, a network packet flow identification library uses a hash table (i.e., the flow lookup table) on which to perform network flow lookups. However, during the hashing process, hash collisions may occur. Different techniques have been developed to address hash collisions, including multi-level hashing and bucketized hash tables with chaining. One such technique, cuckoo-hashing, has emerged as a memory-efficient, high performance hashing scheme for resolving hash collisions during flow lookup table lookups using data plane libraries and network interface controller drivers of a network packet input/output (I/O) engine (e.g., INTEL® Data Plane Development Kit (DPDK)) for fast network packet processing (e.g., flow lookup table lookup, software router/switch functionality, etc.).

In today's high-performance SDN environments, it is necessary to support read-write concurrency of flow tables. In other words, when a core of the general purpose processor is updating the flow lookup table, another core of the general purpose processor should be able to perform a flow lookup in parallel, without needing to lock the flow lookup table. While techniques for supporting single-writer multiple reader concurrency of cuckoo-hash tables have been recently introduced, they do not support concurrent write access. This results in reduced performance for high-workload environments.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 10a and 10b are schematic diagrams illustrating adding a new key entry to a cuckoo hash table, wherein FIG. 10a shows a condition of the cuckoo hash table before the new key entry is added, and FIG. 10b shows the condition of the cuckoo hash table after the new key entry has been added;

DETAILED DESCRIPTION

Figure 1:
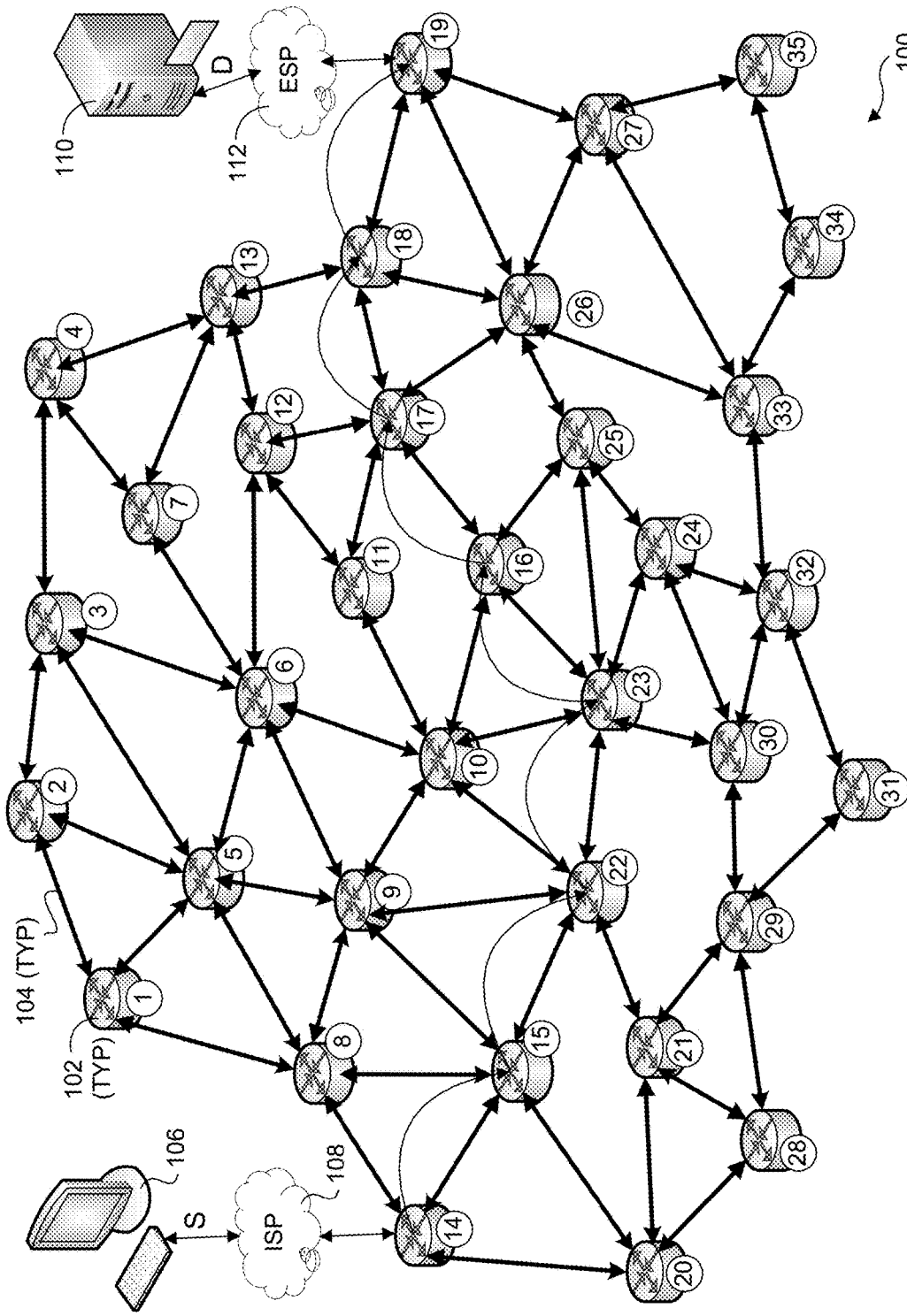
FIG. 1 is a network diagram illustrating a conventional computer network in which multiple network devices are interconnected via various links.

Embodiments of methods and apparatus to support multiple-writer/multiple-reader concurrency for software flow/packet classification on general purpose multi-core systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

FIG. 1 depicts a conventional computer network architecture 100 employing a plurality of network devices 102 labeled 1-36 communicatively coupled to one another via links 104. A source computer 106 is coupled to switch 14 via an Internet Service Provider (ISP) network 108. On the other side of the network a destination computer 110 comprising an e-mail server is connected to switch 20 via an e-mail service provider (ESP) network 112.

Each of network devices 1-35 includes a routing or forwarding table that is used to route/forward packets to a next hop based on various criteria, which typically includes the destination address. (It is noted that switches with this type of functionality may also be referred to as routers; more generally, such switches/routes are considered network elements.) Under various routing protocols such as (Routing Information Protocol) RIP and Open Shortest Path First (OSPF), both of which are layered over the Internet Protocol (IP), data is partitioned into multiple packets that are routed along a path between a source endpoint and a destination endpoint, such as depicted by source computer 106 and destination computer 110. In general, the path traversed by a given packet may be somewhat arbitrary, which is part of why the Internet is so robust. Since packets between endpoints can travel along different paths, when a network switch goes down or is taken offline, the routing tables for the other network devices are updated to route packets along paths that do not include that switch.

FIG. 1 further illustrates an exemplary routing path that includes hops between network devices 14, 15, 22, 23, 16, 17, 18, and 19. Of course, subsequent packets may be routed along different routes, depending on the traffic being transmitted between source computer 106 and a destination computer 110, as well as real-time network operating conditions and traffic handled by the various network devices.

In order to improve network performance, packet classification and flow-based forwarding/routing is employed. Under a flow-based scheme, packets that are part of a stream of data transmitted between a pair of endpoints are classified to the same flow and are routed along the same path (for at least the portion of the path employing network devices supporting flow-based forwarding/routing). This alleviates several of the problems with more arbitrary routing, such as packets arriving out of order.

The network architecture 100 of FIG. 1 is illustrative of a large computer network, or more accurately a collection of sub-nets connected by applicable network devices that connect larger segments of the network. Historically, the network devices employed for this purpose include telecommunication (telco) switches, manufactured by companies such as Cisco, Juniper, Alcatel-Lucent, and others. These telco switches are typically configured as a rack with multiple cards configured with special-purpose hardware. As more sophisticated routing and flow-management techniques have been introduced, the software running on these systems has become ever more important.

In recent years, implementation of "cloud-based" services, high-performance computing (HPC) and other activities employing data centers and the like have seen widespread adoption. Under a typical data center installation, a large number of servers installed in server chassis and server racks are interconnected in communication using network links (e.g., Ethernet) and various switching mechanisms, such as switch blades/modules and "top-of-rack" (ToR) switches. In some installations, additional links, such as InfiniBand or Fibre Channel, may be used for storage and other purposes.

Data centers commonly employ a physical hierarchy of compute, network and storage shared resources to support scale out of workload requirements. The de facto control plane to manage such compute, networking and storage shared resource is Ethernet and the network protocol for manageability is TCP/IP based. Each shared resource typically has a management controller to provide manageability access point and addressed via IPv4 or IPv6 addresses. Data centers generally implement VLANs (Virtual Local Area Networks) to separate control plane traffic from the data plane traffic.

Figure 2:
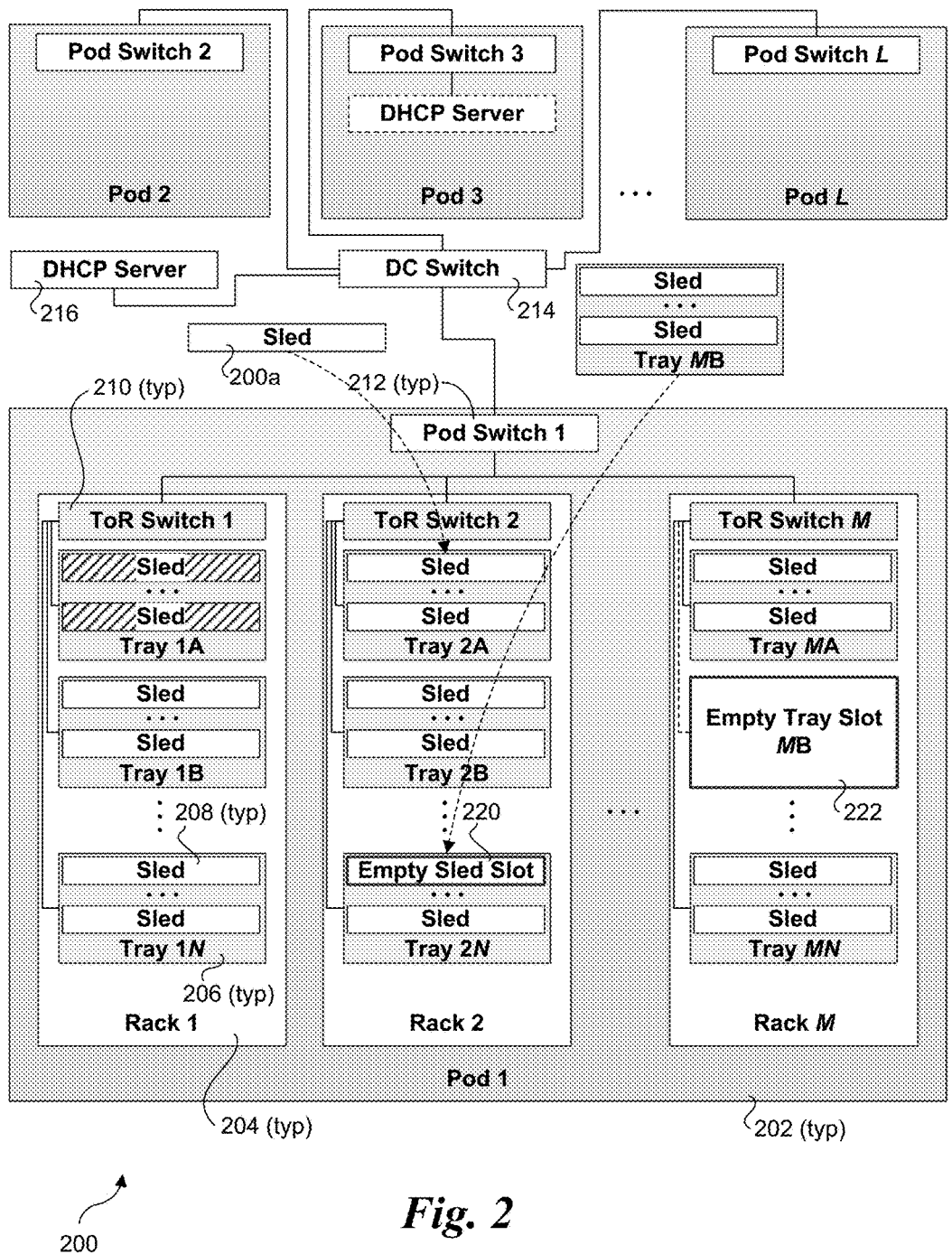
FIG. 2 is a schematic block diagram illustrating a data center physical hierarchy including pods, racks, trays, and sleds.

FIG. 2 shows a portion of a data center 200 an exemplary physical hierarchy in a data center 200 including a number L of pods 202, a number M of racks 204, each of which includes slots for a number N of trays 206. Each tray 206, in turn, may include multiple sleds 208. For convenience of explanation, each of pods 202, racks 204, and trays 206 is labeled with a corresponding identifier, such as Pod 1, Rack 2, Tray 1B, etc.

Depicted at the top of each rack 204 is a respective TOR switch 210, which is also labeled by TOR Switch number. Generally, TOR switches 210 are representative of both TOR switches and any other switching facilities that support switching between racks 204. It is conventional practice to refer to these switches as TOR switches whether or not they are physically located at the top of a rack (although they generally are).

Each Pod 202 further includes a pod switch 212 to which the pod's TOR switches 210 are coupled. In turn, pod switches 212 are coupled to a data center (DC) switch 214. The data center switches may sit at the top of the data center switch hierarchy, or there may be one or more additional levels that are not shown. For ease of explanation, the hierarchies described herein are physical hexarchies that use physical LANs. In practice, it is common to deploy virtual LANs using underlying physical LAN switching facilities.

Data center 200 further includes a DHCP (Dynamic Host Control Protocol) server 216 that is configured to allocate and manage IP addresses. For simplicity, Pod 1 depicts a DHCP server 216 connected directly to DC switch 214. Generally, the DHCP server may be hosted by a stand-alone server or may be hosted on one of the compute nodes in one of the pods that is connected to a DC switch through one or more switch layers in the hierarchy. Under other configurations, a respective DHCP server may provide DHCP functions for each pod or a group of pods. As another option, multiple DHCP servers may operate in a distributed manner to implement DHCP operations for a domain or sub-domain spanning multiple pods.

In order to communicate with other compute nodes and resource hosts in the data center, each compute or storage hosts (collectively referred to compute nodes and storage nodes herein) needs to have a unique address in accordance with the communication protocol used for the data center network (noting that different portions of a data center may employ different network protocols). In the embodiments herein, the network protocol is Ethernet, and the network layer protocol used is IP (Internet Protocol). As discussed above, IP traffic in data centers typically employs Transmission Control Protocol (TCP) at the transport layer to confirm delivery of transferred data using the widely-used TCP/IP protocol.

As discussed above, virtualization, and the use of SDN has seen dramatic increases in recent years. Under a virtualized data center, each compute node may support multiple virtual compute nodes, increasing the number of available compute node substantially, which requires a corresponding increase in switching/routing facilities. In addition to physical switch resources, SDN environments employ software-based virtual switches.

As an exemplary use of software-based routing, today's Linux distribution comes with built-in routing functionality, enabling Linux boxes (i.e., computers or servers implementing a Linux distribution) to operate as a software-based router. FIG. 1 shows an example of a network configuration that employs a Linux server 100 as a software router 102 that supports routing of packets between three subnets 104, 106, and 108. Although shown as a separate component for illustrative purposes, software router 102 is physically implemented within Linux server 300, as described in further detail below. As with conventional hardware-based routers, Linux router 302 employs a routing table that is used for determining which output port a received packet it to be routed through using well-known protocols and routing techniques. Packets from subnets 304, 306, and 308 are received at input ports of one or more NICs installed in Linux server 300, and are buffered up to the operating system (OS) where the routing table resides. After being processed, each packet is sent out to an appropriate NIC output port to route the packet to the correct destination subnet determined via the software-based packet routing scheme implemented by software router 302.

Figure 3:
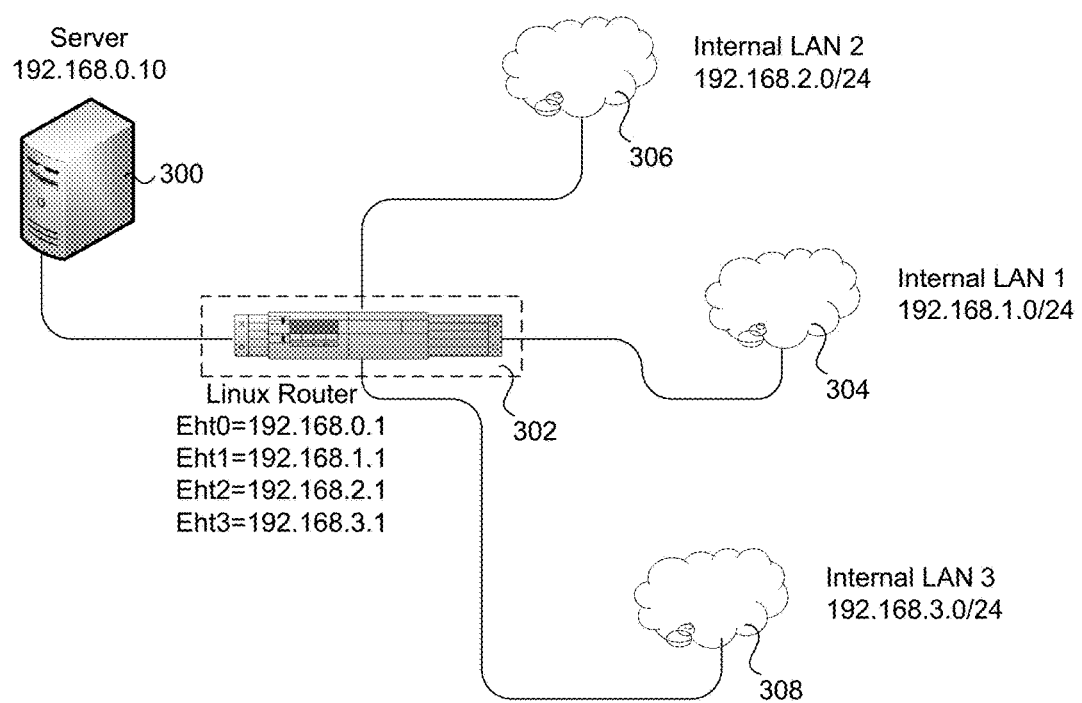
FIG. 3 is a schematic diagram illustrating an exemplary network employing a software-based router in a Linux server.

In general, the input and output ports employed for routing/forwarding a given packet may be on the same NIC or different NIC (if multiple NICs are employed). For example, newer Ethernet NICs support up to 8 ports, while a server such as Linux server 300 may be configured with one or more NICs, depending on the network complexity and the number of ports required to facilitate the desired routing paths through software router 302. For instance, a software router may be configured as a router for a given subnet by routing traffic along a single link between the router and an edge node in the subnet, as depicted in FIG. 3, or the router may be connected to the subnet via multiple links to a single edge node or multiple edge nodes.

The network devices and software-based switching elements of the foregoing network architectures each employ similar forwarding techniques. Each includes multiple network ports over which traffic (e.g., as UDP packets and TCP packet streams) is received at and transmitted from. The objective of the forwarding operation is to identify the network port a given packet is to be sent out of To identify this network port, the network device or software-based switch performs a hash-based lookup operation on a flow lookup table (e.g., a hash table that maps hashed flow entry keys to network ports) to determine the outbound port for the packet. To do so, the lookup operation performs a hash on information related to the network packet (e.g., a destination IP address, destination media access control (MAC) address, 5-tuple flow identification, etc.) and uses the result to check against the flow lookup table.

The flow lookup table includes a match field that contains either a specific value that corresponds to a parameter of the network packet, or a value that indicates the flow entry is not included in a particular flow's parameter set. Each hash table row, or "bucket," may include one or more key/value pair, wherein the key identifies some item of data (e.g., a network packet flow identifier) and the value provides a location of the data (e.g., the flow data corresponding to the network packet flow identifier) in another location, such as another table, or an network port. For example, if a hash table is a four-way association table, one bucket can support four key/value pair entries. Additionally, each key may be mapped to more than one bucket. For example, an array of hash functions may be provided such that different buckets can be mapped to a key based on which hash function was applied to the key.

Under one approach, to support read/write concurrency of the flow lookup table, the network device or software-based switch associates a version counter with one or more hash table entries, or buckets, in the flow lookup table, which are incremented each time the associated bucket is modified. Unlike traditional concurrency support methods that require state comparisons of version counters with each lookup operation, using load/store instructions that are written and/or read atomically (e.g., streaming single instruction, multiple data (SIMD) extensions 2 (SSE2) load/store instructions) may ensure a value associated with a found key is valid. As such, performing the version counter state comparison is only required when the key is not found in its corresponding bucket, thereby reducing the overhead associated with performing the comparison on each lookup.

In general, each of the network devices and software-based switched described herein may be embodied as any type of computation or computer device capable of managing communications and performing the functions described herein, including, without limitation, a general purpose computing device, a network appliance (e.g., physical or virtual), a web appliance, a router, a switch, a multiprocessor system, a server (e.g., stand-alone, rack-mounted, blade, etc.), a distributed computing system, or other types processor-based system. In some embodiments, such as in SDN and/or network functions virtualization (NFV) architectures, one or more of the network devices or software-based switches may run one or more virtual machines (VMs) to implement the switching/routing/forwarding functions in software.

Figure 4:
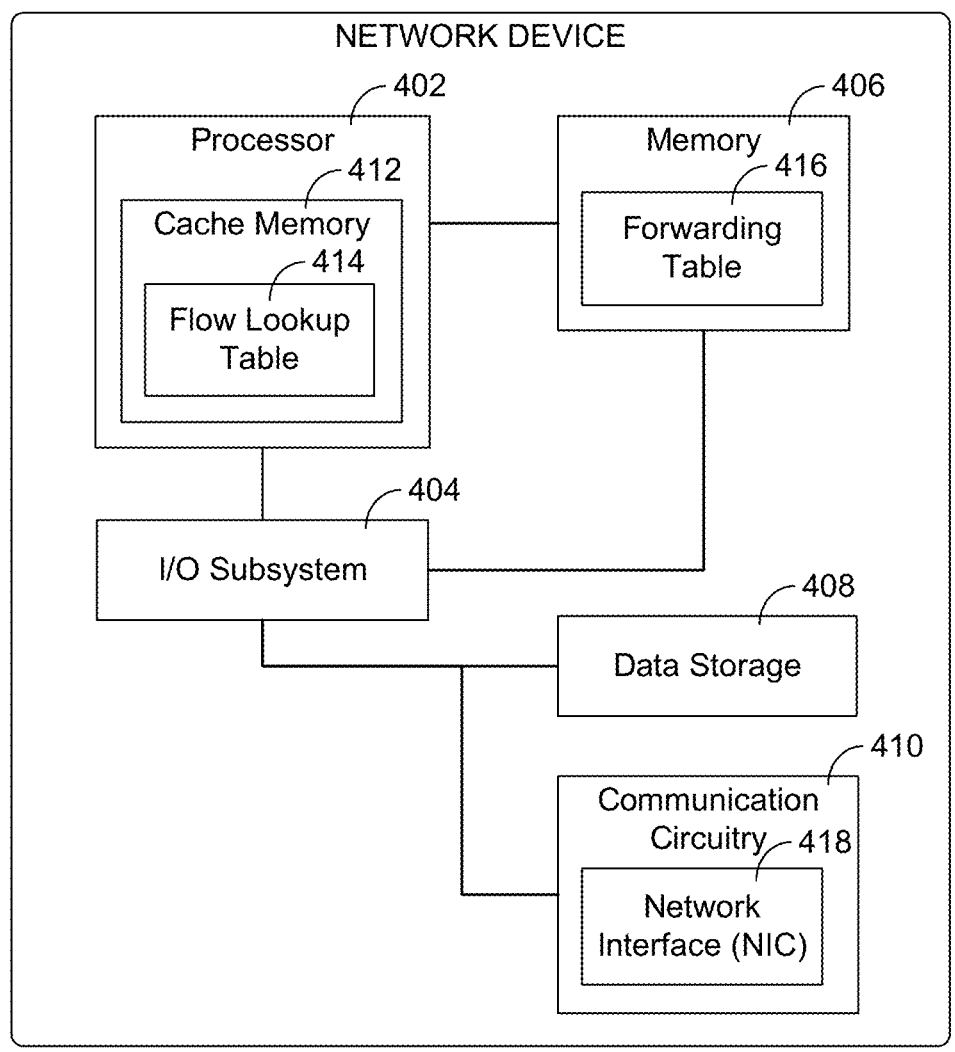
FIG. 4 is a block diagram illustrating selected components of one embodiment of a network device.
Figure 5:
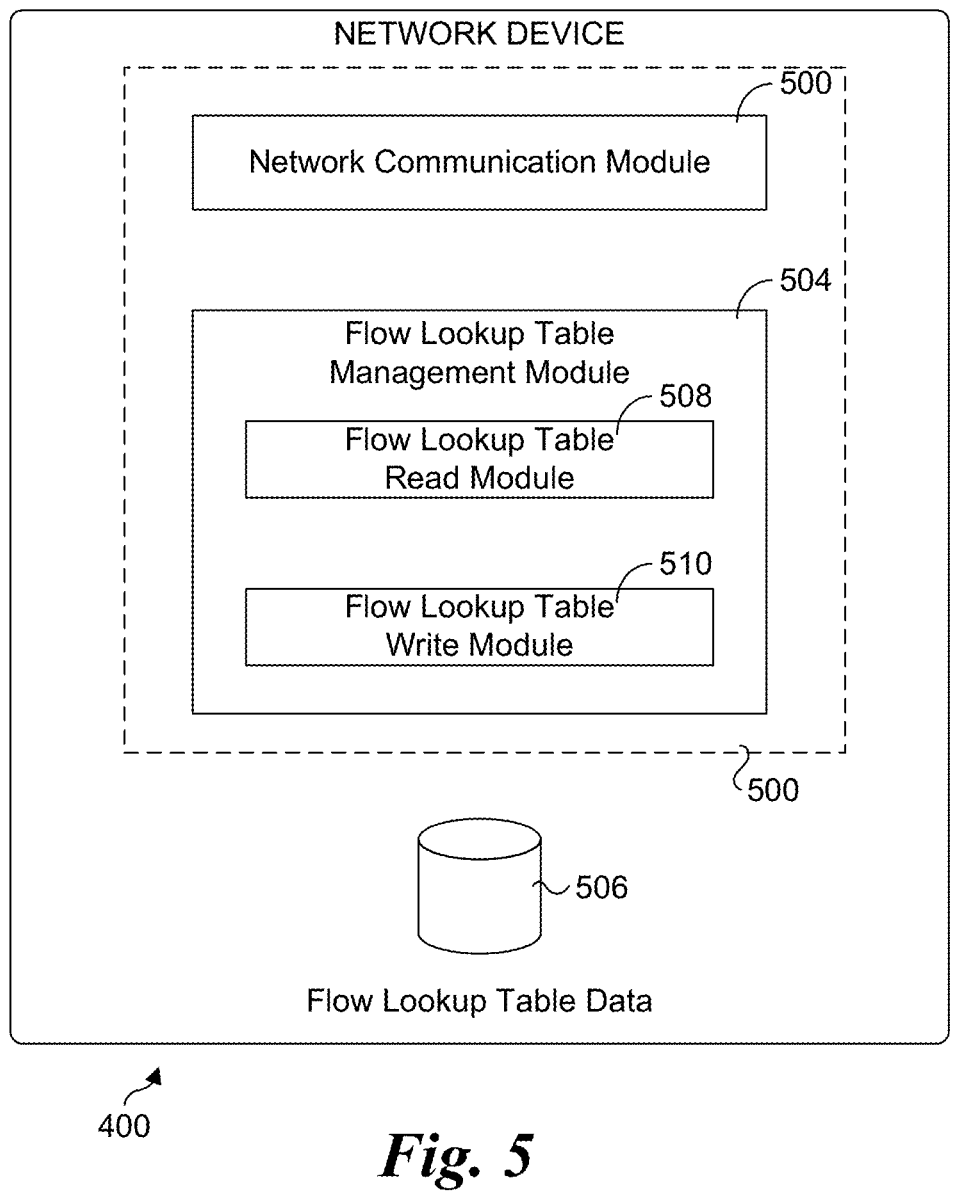
FIG. 5 is a block diagram illustrated selected modules implemented for one embodiment of a network device.

A high-level architecture of an exemplary network device 400 is shown in FIG. 4. Network device 400 includes a processor 402, an input/output (I/O) subsystem 404, a memory 406, a data storage device 408, and communication circuitry 410. As will be recognized by those skilled in the art, in other embodiments, the network device 400 may include alternative or additional components, such as those commonly found in a server, router, switch, or other network device. Additionally, in some embodiments, one or more of the illustrative components may be incorporated in, or otherwise form a portion of, another component. For example, the memory 406, or portions thereof, may be incorporated in one or more processors 402 in some embodiments.

Generally, processor 402 may be embodied as any type of processor capable of performing the functions described herein. For example, processor 402 may be embodied as a single-core processor or a multi-core processor, multiple processors, a digital signal processor, a microcontroller, a graphics processing unit (GPU), a general purpose GPU (GPGPU), an accelerated processing unit (APU), a field-programmable gate array (FPGA), or other processor or processing/controlling circuit. Memory 406 may be embodied as any type of volatile or non-volatile memory or data storage capable of performing the functions described herein. In operation, memory 406 may store various data and software used during operation of the network device 400 such as operating systems, applications, programs, libraries, and drivers. The memory 406 is communicatively coupled to the processor 402 via an embedded memory controller or the like (not shown). Memory 406 can also be accessed by communication circuitry 410 via I/O subsystem 404, which may be embodied as circuitry and/or components to facilitate input/output operations with the processor 402, memory 406, and other components of network device 400. For example, the I/O subsystem 404 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, I/O subsystem 404 may form a portion of a system-on-a-chip (SoC) and be incorporated, along with processor 402, memory 406, and other components of the network device 400, on a single integrated circuit chip.

The illustrative network device 400 includes a cache memory 412 that may be embodied as an on-die cache, or an on-processor cache. In some embodiments, cache memory 412 may be embodied as any type of cache memory that processor 402 can access more quickly than memory 406. For example, in some embodiments, all or a portion of cache memory 412 may be an off-die cache, but reside on the same SoC as the processor 402.

During operation, as will be described in further detail below, network flow information is written to a flow lookup table 414, which provides mapping information to a forwarding table 416, which may be too large to be stored in the cache memory 412. The network flow information may include information such as, for example, a flow identifier and a flow tuple (e.g., a source IP address, a source port number, a destination IP address, a destination port number, and a protocol) corresponding to a particular network flow. It should be appreciated that the network flow information may include any other type or combination of information corresponding to a particular network flow. In some embodiments, a network controller (not shown), such as SDN controller, connected to a network device 400 may define the flow (i.e., compute a route for the flow) and provide the defined flow for entry into flow lookup table 414 for each network device along the transmission path identified by the flow.

While the illustrative flow lookup table 414 is stored in the cache memory 412, in some embodiments, at least a portion of flow lookup table 414 may be stored in the memory 406 (i.e., main memory) of network device 400. Due to the latency associated with having to perform a lookup for the network flow information in forwarding table 416 in the memory 406, key/value pairs may be stored in entries of flow lookup table 414 (e.g., a hash table, or hash lookup table) that map input values (e.g., data related to received network packets) to forwarding table entries of forwarding table 414.

Data storage device 408 may be embodied as any type of device or devices configured for short-term or long-term storage of data such as, for example, memory devices and circuits, memory cards, hard disk drives, solid-state drives, or other data storage devices. In some embodiments, data storage device 408 may be used to store the contents of one or more trusted execution environments. When stored by data storage device 408, the contents of the trusted execution environments may be encrypted to prevent access by unauthorized software.

Communication circuitry 410 may be embodied as any communication circuit, device, or collection thereof, capable of enabling communications over the network links between the networks network device 400 is installed. The communication circuitry 410 may be configured to use any one or more communication technologies (e.g., wired or wireless communications) and associated protocols (e.g., Ethernet, InfiniBand, Bluetooth®, Wi-Fi®, WiMAX, etc.) to effect such communication. The illustrative communication circuitry 410 additionally includes a network interface card (NIC) 418. Generally, NIC 418 may connect network device 400 in communication with any other network device or endpoint device employing the same protocol(s). NIC 418 may be embodied as one or more add-in-boards, daughtercards, network interface cards, controller chips, chipsets, or other devices that may be used by network device 400.

During operation network device 400 establishes an execution environment 500. In the illustrative execution environment 500, network device 400 includes a network communication module 502 and a flow lookup table management module 504. The illustrative execution environment 500 additionally includes flow lookup table data 506 that may include network flow related information. The various modules of the execution environment 500 may be embodied as hardware, firmware, software, or a combination thereof. For example, the various modules, logic, and other components of execution environment 500 may form a portion of, or otherwise be established by, the processor 202 or other hardware components of network device 400. As such, in some embodiments, any one or more of the modules of execution environment 500 may be embodied as a circuit or collection of electrical devices (e.g., a network communication circuit, a flow lookup table management circuit, etc.). Additionally or alternatively, in some embodiments, one or more of the illustrative modules may form a portion of another module and/or one or more of the illustrative modules and/or submodules may be embodied as a standalone or independent module.

Network communication module 502 is configured to facilitate network communications between network device 400 and other devices in the network. For example, network communication module 502 is configured to receive and process network packets received by network device 400 and to prepare and transmit network packets from network device 400. Accordingly, at least a portion of the functionality of network communication module 502 may be performed by communication circuitry 410, and more specifically by the NIC 418. Additionally, network communication module 502 may process received network packets by parsing at least a portion of the network packet (e.g., packet header) to determine network flow information (e.g., 5-tuple flow identification, a source IP/MAC/port, a destination IP/MAC/port, etc.) of the received network packet and/or prepare a network packet for transmission by updating the network packet with updated network flow information.

The flow lookup table management module 504 is configured to manage flow lookup table data 506 of a flow lookup table (such as flow lookup table 414 in FIG. 4). As described above, flow lookup table 414 includes of a number of buckets that each includes one or more key/value pairs and a corresponding version counter. The flow lookup table management module 504 includes a flow lookup table read module 508 and a flow lookup table write module 510 to support concurrent reading from and writing to a flow lookup table.

Figure 7:
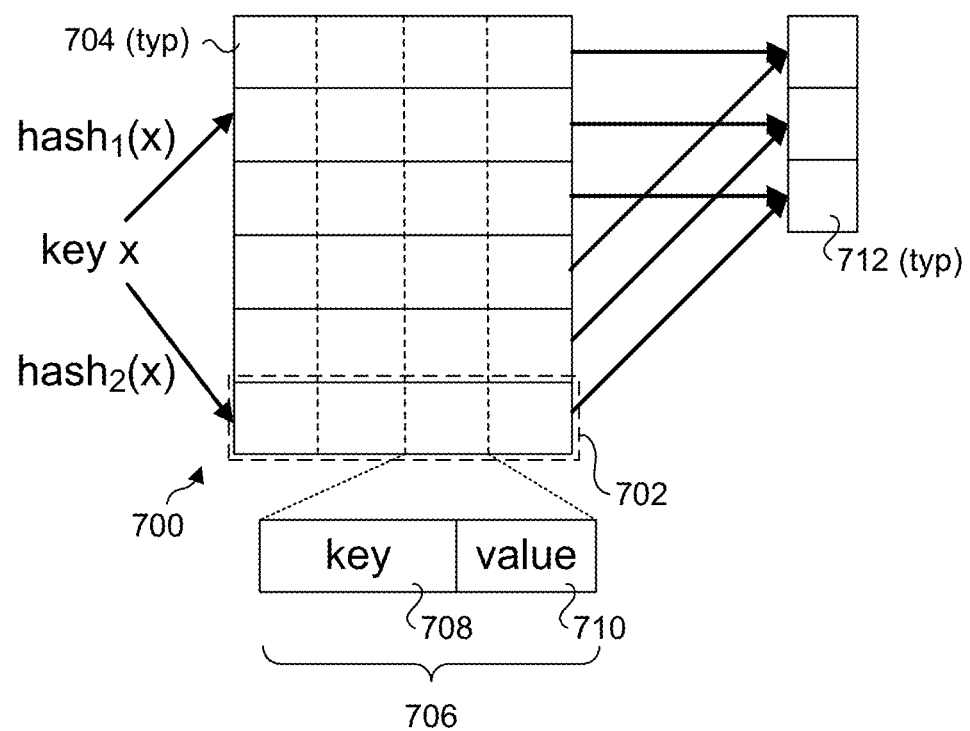
FIG. 7 is a schematic diagram illustrating a four-way cuckoo hash table embodied as a two-way (hash) function, four-way association lookup table.
Figure 10A:
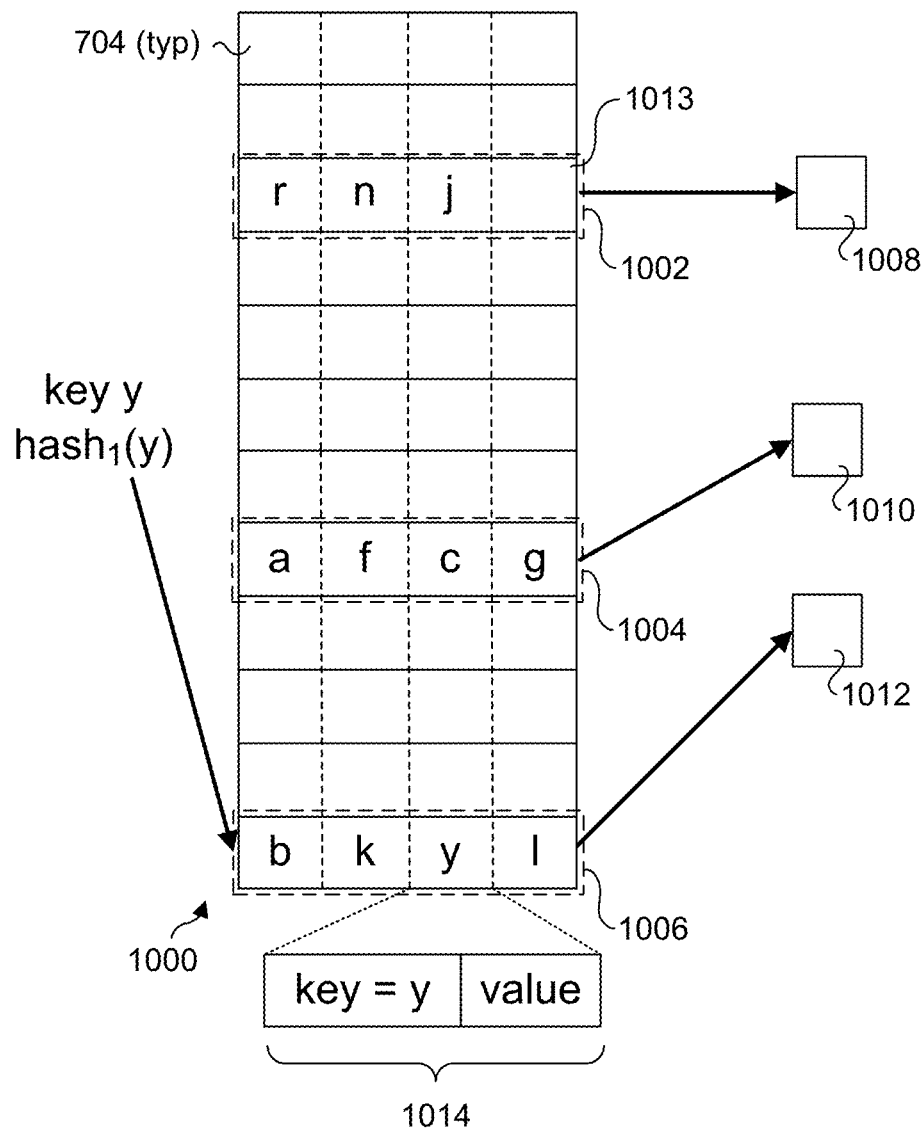
Figure 10B:
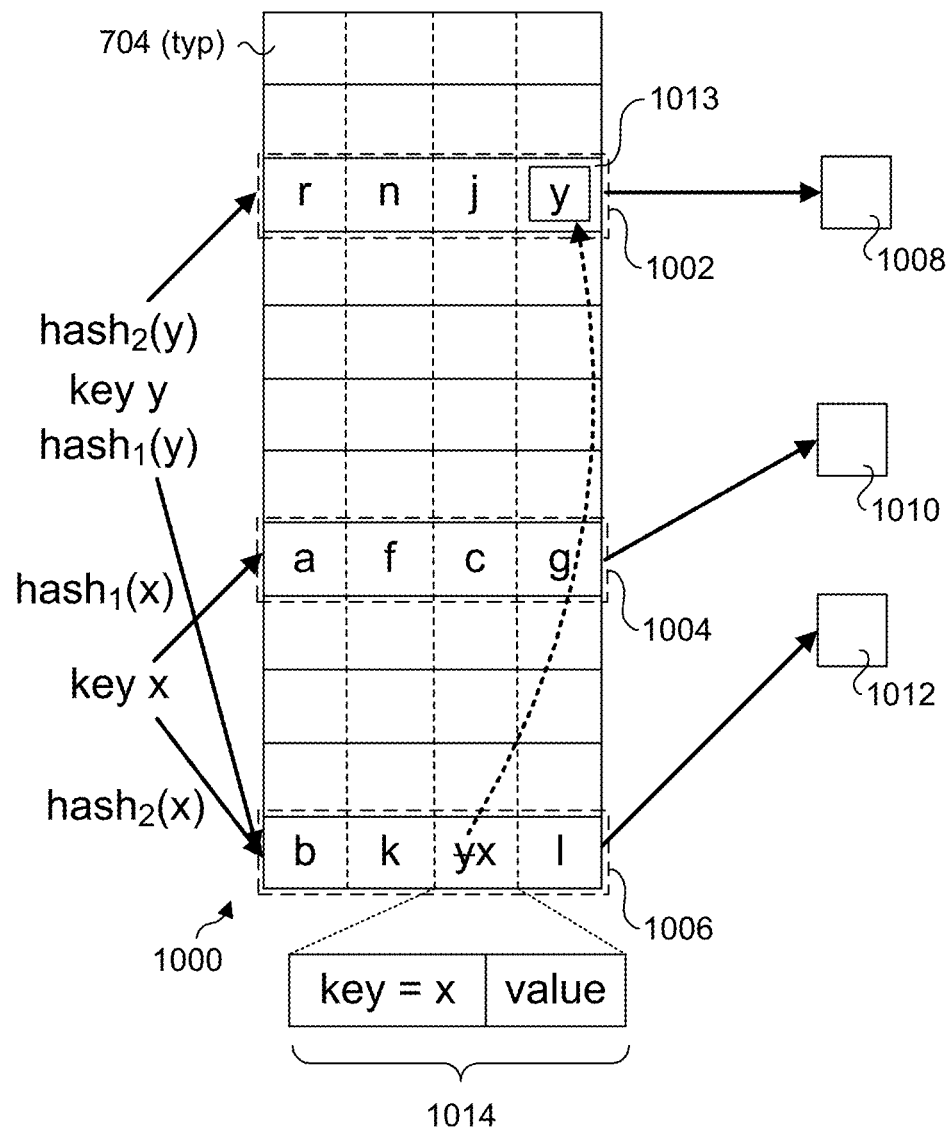

Flow lookup table read module 508 is configured to perform read operations on the flow lookup table to read from flow lookup table data 506. Flow lookup table read module 508 may be configured to perform a lookup on the flow lookup table data, embodiments of which are shown in FIGS. 7, 10a, and 10b. In some embodiments, flow lookup table read module 508 may be configured to perform multiple read operations in parallel without the need for any locks or mutexes. As described previously, a version counter may be associated with each hash table bucket based on the structure of the flow lookup table (e.g., a way-number of a way-association of the flow lookup table). Unlike traditional read/write conflict detection methods that require comparing the version counter pre- and post-read operation, flow lookup table read module 508 only performs the version counter comparison after a read operation if the key of the key/value pair was not found in the expected location, or bucket, in the flow lookup table during the read/lookup operation.

Flow lookup table write module 510 is configured to perform write operations on the flow lookup table data to write to flow lookup table 414. Flow lookup table write module 510 may be further configured to perform a displacement process, as shown in FIGS. 10a and 10b below, when updating or inserting key/value pairs into flow lookup table data 506. Flow lookup table write module 510 increments the version counter each time the flow lookup table write module accesses a bucket for modification, and against when the flow lookup table write module modifies the bucket.

In some embodiments, the overhead associated with the version counter check and comparison may be reduced by using intrinsic load and store instructions based on the architecture of processor 402 of network device 400. For example, in an INTEL® Architecture (IA) embodiment, the IA intrinsic instructions may include "mm_load" to read the key/value pair and "mm_store" to write the key/value pair. Additionally, to support atomic operation, the key/value pair may be stored in a single cache-aligned data structure (i.e., both the key and the value are stored in the same data structure), based on a size of the entries of the flow lookup table. For example, if a size of an entry in the flow lookup table data 506 is equal to 16 bytes, the single cache-aligned data structure may have a size of less than or equal to 16 bytes. As a result, flow lookup table write module 510 may displace the key/value pair in a single operation, rather than one write operation for the key and another write operation for the value. Accordingly, if a key/value pair is found (i.e., read by the flow lookup table read module 508) in the flow lookup table, the value associated with a found key may be presumed to be valid. In other words, if the key/value pair is found in the flow lookup table, it can be presumed that it is not in the process of being updated.

As discussed above, the use of virtualization in data centers increases the number of compute nodes substantially. Moreover, very large data centers may interconnect hundreds of thousands of devices—in order to forward between such devices, extremely large forwarding tables are necessary. One common approach to building fast Ethernet switches is to use a custom ASIC coupled with specialized, high-speed memory (e.g., TCAM) to store the forwarding table data. However, these memories are expensive, power hungry, and very limited in size. For example, the midrange Mellanox SX1016 64-Port 10 GbE switch supports only 48K Layer-2 forwarding entries. Software-based switches on commodity hardware, in contrast, can affordably store larger tables in SRAM (CPU cache) or DRAM.

In order to better take advantage of the architecture of commodity servers and similar platforms running x86-based processors, INTEL® Corporation has developed a Data Plane Development Kit, or DPDK, which is a set of libraries optimized for NIC drivers designed for high-speed packet-processing on x86 platforms. DPDK places devices drivers, which are commonly part of an operating system (OS) kernel, in user-space to allow zero-copy packet processing without needing to modify the OS kernel. To enhance efficiency, it hands batches of packets to processing threads to be processed together.

Figure 6:
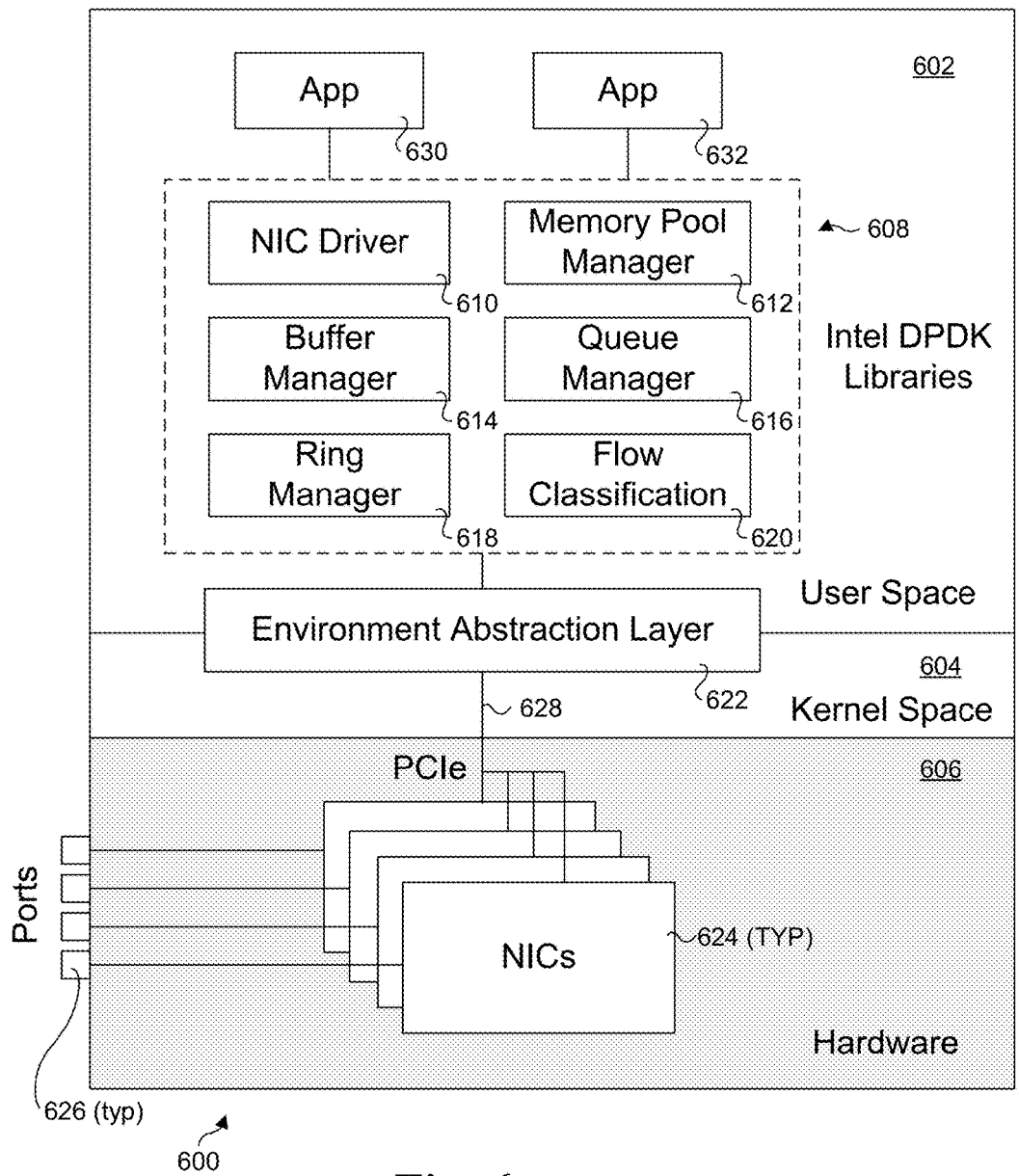
FIG. 6 is a schematic block diagram illustrating an architecture for an INTEL® Data Plane Development Kit (DPDK)

An illustration of a DPDK architecture 600 is shown in FIG. 6. As shown, DPDK architecture 600 includes a user space 602, a kernel space 604 and hardware 606. As stated above, the DPDK libraries 608 are implemented in user space 602, rather than kernel space 604. The DPDK libraries include NIC drivers 610, a memory pool manager 612, a buffer manager 614, a queue manager 616, a ring manager 618 and flow classification 620. These user space components are interfaced to hardware components in hardware 606 via an environment abstraction layer 622. In FIG. 6, the illustrated hardware components include multiple NICs 624, which are coupled to the network via ports 626. NICs 624 are also shown coupled to environmental abstraction layer 622 via PCIe interconnects 628; PCIe supports DMA (direct memory access) reads and writes using memory mapped IO (MMIO) on the NICs, enabling packets to be transferred between buffers in user space 602 and NICs 624 without processor intervention.

Memory pool manager 612 is responsible for allocating pools of objects in memory. A pool is created in huge page memory space and uses a ring to store free objects. It also provides an alignment helper to ensure that objects are padded to spread them equally on all DRAM channels. Buffer Manager 614 reduces by a significant amount the time the operating system spends allocating and de-allocating buffers. The DPDK pre-allocates fixed size buffers which are stored in memory pools. Queue manager 616 implements safe lockless queues, instead of using spinlocks, which allow different software components to process packets, while avoiding unnecessary wait times.

Flow classification 620 provides an efficient mechanism that incorporates INTEL® Streaming SIMD Extensions (INTEL® SSE) to produce a hash-based on tuple information so that packets may be placed into flows quickly for processing, thus greatly improving throughput. NIC drivers 610 include includes poll mode drivers for 1 GbE and 10 GbE Ethernet controllers that are designed to work without asynchronous, interrupt-based signaling mechanisms, which greatly speeds up the packet pipeline.

During operation, applications 630 and 632 operate as packet consumers and producers, and are illustrated of various types of applications supported by the DPDK architecture. In addition, applications 630 and 632 may be illustrated of NFV appliances and the like.

As discussed above, flow tables employ the use of hashing schemes to store and retrieve hashed-based key-value pairs. Conventional hash-based lookup tables, however, are typically memory-inefficient, which becomes important when attempting to achieve large scale or fit lookup tables into fast, expensive SRAM. For example, extra space is required to avoid collisions in hash tables, which results when two different keys produce the same hash result. In addition, to avoid locking overhead while allowing multiple threads to be read from the forwarding table, pointer-swapping approaches such as Read-Copy Update are used to update the table, which requires storing two full copies of the table instead of one.

One approach to address this problem is to use a hash table scheme known as cuckoo hashing. Under cuckoo hashing, a key is hashed with a first hash function, which identifies a first candidate row (bucket) in which the key can be stored, along with an associated value. Each bucket has a number of entries it can hold. As long as there are available entries for a given bucket, a new key will be added to that bucket. However, if the bucket resulting from hashing the key with the first hash function is full, a second hash function is used, and the key-value pair is stored at the row corresponding to the result of the second hash function. Under some conditions, both buckets will be full, in which case one of the existing entries is evicted and relocated by rehashing the key to identify the bucket it will be relocated to. If necessary, this key relocation process may be cascaded multiple times.

Read access of a cuckoo hash table proceeds as follows (without considering concurrent access, for the time being). The first hash will be applied to the key, identifying a first candidate bucket in which the key is stored. The entries in the bucket will be searched to locate the correct entry via matching keys. If no match is found, the second hash function is applied to identify a second candidate bucket, with a guarantee that the key will be stored in an entry in one of the first and second candidate buckets.

FIG. 7 shows an exemplary cuckoo hash table 700 embodied as a two-way (hash) function, four-way association lookup table under which each row or bucket 702 includes four entries 704 for storing key/value pairs 706, wherein each entry includes a key 708 and its associated value 710. Optionally, the value may be a pointer to another table or data structure via which an applicable value is stored. In addition, each bucket 702 is mapped to a corresponding version counter 712. To reduce the number of version counters, each version counter is mapped to multiple buckets via striping. (While two is shown in this example, more generally, a given version counter may be mapped to 1-n buckets.) Additionally, while a four-way set-associative hash table is shown in the illustrative embodiment, it should be appreciated that an alternative set-associative hash table may be used.

Under an existing single-writer/multiple-reader concurrency scheme, to ensure that readers see valid data with respect to the concurrent writer, the version counters are used by the readers to detect any change being made while they were accessing a bucket. The writer increments the version-counter whenever it modifies a bucket; each reader snapshots and compares the version numbers before and after reading the corresponding buckets. This way, readers detect read-write conflicts from the version-counter change.

To support multiple concurrent writers in a lockless fashion, a basic aspect of the embodiments herein is to guarantee that only one writer can acquire the update-right of a certain critical section (bucket) at any given moment. In one embodiment, this is achieved, in part, through use of the compare-and-swap (CAS) instruction available on some processors. For example, for INTEL® Architecture (IA) processors, the corresponding CAS instruction is called compare-and-exchange instruction (CMPXCHG). CAS performs compare and swap in an automatic fashion (with lock prefix) to guarantee that the value update is based on the newest version. CAS compares the contents of a memory location to a given value and, only if they match, modifies the contents of that memory location to a given new value. The atomicity of this operation guarantees that the new value is calculated based on up-to-date information; if the value had been updated by another thread in the meantime, the instruction will return "fail."

When a writer thread wants to update, it first reads the version counter (V_old) of the corresponding bucket; if it is odd, indicating an update is ongoing, the reader will read the version counter again until it is even. When V_old is even, the writer performs CAS (*(version counter), V_old, V_old+1). This compares the current version counter value to V_old, and if they match, the version counter value is updated to V_old+1 and success is returned. This guarantees only this writer acquires the update-right to this section, and the version counter is increased by 1 to an odd number, so other readers and writers are aware that an update is ongoing. The readers and other writers operating on different critical sections can perform their operations in parallel without impacted by this update. If the CAS returns "fail," indicating another writer thread acquires the update-right. This writer thread will start over again from reading current version_counter.

In the following example, an implementation using a cuckoo hash table is described and illustrated. However, this is not limiting, as the techniques may be applied to a conventional single-function hash table as well, as long as each critical section (one or more buckets) is associated with a version counter. It also applies to the data structure where the value is separately stored from the key; wherein the key is a pointer pointing to the value.

Figure 8:
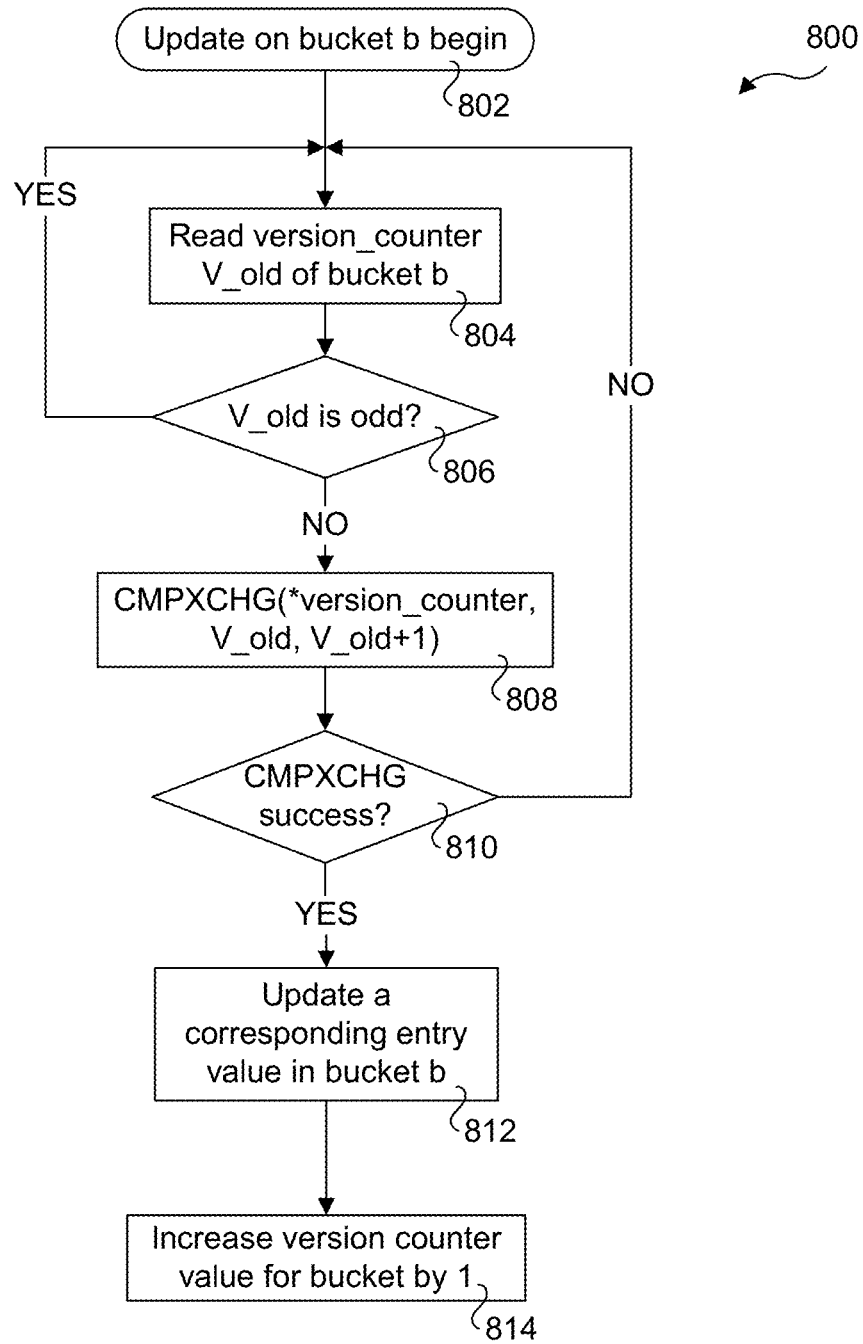
FIG. 8 is a flowchart illustrating operations and logic for updating entries in the cuckoo hash table buckets while supporting multiple concurrent writes and reads, according to one embodiment.

FIG. 8 shows a flowchart 800 illustrating operations and logic for the writer thread's update process, according to one embodiment. The process begins in a start block 800 in which an update on bucket b begins. In a block 804 the version counter V-old of bucket b is read. In a decision block 806 a determination is made to whether V_old is odd. If it is (answer YES), then the logic loops back to block 804. If V_old is even, the answer to decision block 806 is NO, and the logic proceeds to a block 808 in which a CMPXCHG instruction is executed using a pointer to version counter (*version counter), V_old, and V_old+1 as input parameters.

In a decision block 810, a determination is made to whether the CMPXCHG instruction was successful. If not (NO), the logic loops back to block 804. If YES, the logic proceeds to a block 812 in which a corresponding entry value in bucket b is updated. The version counter value corresponding to bucket b is then increased by 1 in a block 814.

The cuckoo hashing key insertion process is more complicated than updating an existing value since the insertion process may involve multiple critical sections (buckets) due to the potentially long cuckoo-path. Under an existing approach, after a cuckoo path is found, the two buckets of each displacement (relocation) operation are "locked" (by increasing corresponding version counters by 1) to move the key; as a result, at any given time, only these two buckets are not available for readers to lookup.

To support multiple-writer/multiple-readers for the key insertion case, update-rights are acquired on all critical sections involved in the cuckoo-path before execution. This is to prevent the situation where multiple writers may have overlapping sections for their representative cuckoo paths. If the writer fails to obtain update rights of at least one critical section, (V_old is always odd after certain number of tries or CAS returns "fail"), indicating there is conflicting updating in process, the updating process of this writer will roll back. The roll back process refers to rolling back the version counters of those buckets that are set to odd by successful CAS operations, then waiting for a random time interval and trying again. Waiting for a random interval is used to avoid live lock when several threads may be trying to acquire an update-right on the same sections so they always collide.

Figure 9:
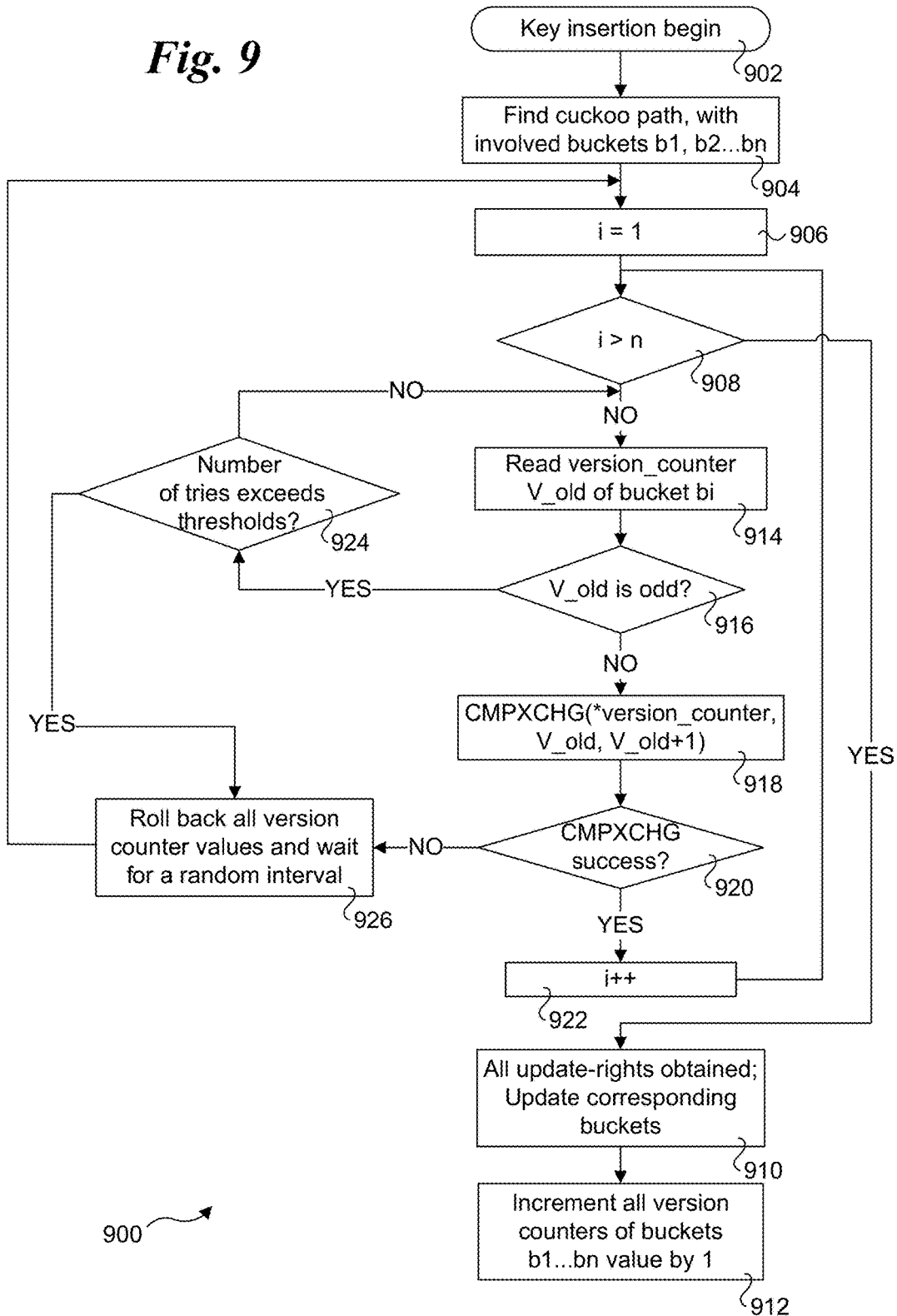
FIG. 9 is a flowchart illustrating operations and logic for inserting new keys into the cuckoo hash table while supporting multiple concurrent writes and reads, according to one embodiment.

FIG. 9 shows a flowchart 900 illustration operations and logic for performing a cuckoo hash table insert supporting multiple concurrent writers, according to one embodiment.

The key insertion process begins in a start block 902, followed by a block 904 in which the cuckoo path that will be used for the insertion and any applicable key relocations is determined. It is noted that the operation of block 904 is a prospective operation that determines a cuckoo path to be used for the key insertion, rather than performing the insertion itself. To better understand what this entails, a cuckoo path in connection with an example key insertion process is illustrated in FIGS. 10a and 10b.

In FIGS. 10a and 10b, hash table 100 is depicted with selected buckets 1002, 1004, and 1006, each associated with a respective version counter 1008, 1010, and 1012. At the beginning of the key insertion process, the four entries in bucket 1002 includes keys 'r', 'n', and 'j', with one remaining empty entry slot 1013. The four entries for bucket 1004 include keys 'a', 'f', 'c', and 'g', while the four entries for buck 1006 include keys 'b', 'k', 'y', and 'l'. As discussed above, each of entries 704 may include a key-value pair; for simplicity and point of illustration, only the keys are shown in FIGS. 10a and 10b. Also as discussed above, a given entry may comprise a pointer to another table or data structure containing a value or a key-value pair. Also, for point of illustration, the keys are depicted as single characters; in practice, a key my typically be a numerical value corresponding to the result of an applicable hashing function. Also, most of the other entries 704 in cuckoo hash table 1000 would also contain existing keys (or key-value pairs); for simplicity and clarity the entries are shown as blanks.

Prior to the timeframe shown in FIG. 10a, key 'y' was inserted into the third entry slot 1014 of bucket 1006. Bucket 1006 was determined by using a first hash function on key 'y', as depicted by $hash_1(y)$. Third entry slot 1014 of bucket 1006 was available (or otherwise made available via a relocation of an existing key), and thus key 'y' and its associated value (not shown) where successfully inserted into entry slot 1014.

Moving to FIG. 10b, now suppose that it is desired to insert a key 'x' into cuckoo hash table 1000. As before, a first hash function is performed on key 'x', as depicted by $hash_1(x)$. The result of this first hash function points to the row corresponding to bucket 1004, as shown. However, each of the entry slots in bucket 1004 are full, so there is not an available entry slot for key 'x', which corresponds to a "miss." As a result, a second hash function is performed on key 'x', as depicted by $hash_2(x)$. This hash function result points to the row corresponding to bucket 1006, which again is full.

In this instance, although the result of the second hash function is a miss, key 'x' needs to inserted into one of the entry slots in buck 1006. In this example, entry slot 1014 is selected, noting various schemes may be used to select which current entry to evict and relocate. Since entry slot 1014 is currently occupied by key 'y', this key needs to be relocated to make room for key 'x'.

The relocation operation is implemented by performing the second hash function on key 'y', as depicted by $hash_2(y)$. This time the resulting row corresponds to bucket 1002, which has an empty slot 1013. Accordingly, key 'y' (or its key-value pair, if applicable) is relocated from entry slot 1014 to entry slot 1013. If bucket 1002 was also full, one of its existing entries would be evicted and relocated to the bucket identified by the result of one of the first and second hash functions, in a similar manner to that illustrated for key 'y'. This relocation process would continue in an iterative manner until an empty slot is found. At that point, the key insertion process would be complete.

Returning to block 904, the cuckoo path is the full path needed to insert the new key, which corresponds in the example illustrated in FIGS. 10a and 10b to identifying buckets b1, b2 . . . bn as buckets 1002, 1004, and 1006, respectively. The identified buckets also are associated with respective version counters 1008, 1010, and 1012, and has the cuckoo path length n=3.

In a block 906, an integer counter i is set to 1. In a decision block 908 a determination is made to whether i>n, the path length determined in block 904. If the answer is NO, the logic proceeds to a block 914 in which the version counter V_old of bucket bi is read. In a decision block 916 a determination is made to whether V_old is odd. If the answer is NO, the logic proceeds to a block 918 in which the CMPXCHG instruction is executed using input parameters including a pointer to the version_counter for bi, along with V_old and V_old+1.

In a decision block 920, a determination is made to whether execution of the CPMXCHG instruction returns a success result. If YES, i is incremented in a block 922, and the logic is returned to decision block 908 to evaluate the next bucket in the cuckoo path. Once each of the buckets along the cuckoo path has been processed, the answer to decision block 908 will be YES, and the logic will proceed to a block 910 that indicates all update-rights have been obtained, and the corresponding buckets b1, b2 . . . bn are updated. The insertion processes in then completed in a block 912 by incrementing all of the version counters for buckets b1, b2 . . . bn by 1.

Returning to decision block 916, if V_old is even, the answer is YES and the logic proceeds to decision block 924 in which a determined is made whether a number of tries exceeds a threshold. The threshold for the number of tries is a parameter that can be configured to prevent deadlock when two paths each acquires a portion of its path, and now are contending a common bucket. The value of the threshold may be set based on the average length of the cuckoo path, to ensure 1) the re-try process is on average patient enough to wait for a potential on-going insertion operation to finish; 2) it won't wait too long if there is a deadlock. If the answer to decision block 924 is NO, the logic returns to block 914.

If the number of tries has exceeded the threshold, the answer to decision block 924 is YES, and the logic proceeds to a block 926 in which all version counters associated with the buckets b1, b2 . . . bn in the cuckoo clock are rolled back, followed by a random wait interval. This effects the aforementioned roll-back operation. As further shown in FIG. 9, if CMPXCHG is not successfully executed, the answer to decision block 920 is NO, which results in the logic also proceeding to block 926 to effect the roll-back operation. At the completion of the random wait interval, the logic returns to block 906.

Generally, the cuckoo path for a table that is not very loaded (such as having an occupancy of <80%) will be relatively short, containing just a few buckets. It is noted that in an actual implementation, the frequency of new key insertions will be much less than the frequency of reads. It is further noted that since each version counter is only responsible for a very small range of the hash table, thus in normal cases, the contention should not be high and the overhead of lock prefix should be manageable.

In one embodiment, the packet processing pipeline has three stages. In the first stage, NICs receive packets from the network and push them into receive (RX) queues using Direct Memory Access (DMA). To spread the load of packet processing evenly across all CPU cores, the NICs use Receive Side Scaling (RSS). RSS is a hardware feature that directs packets to different RX queues based on a hash of selected fields in the packet headers; this ensures that all packets within a flow are handled by the same queue to prevent reordering.

After incoming packets are placed into the corresponding RX queues, a set of user-space worker threads reads the packets from their assigned RX queues (e.g., in a round-robin manner), and extracts the destination MAC address (DMAC) from each packet. Next, DMACs are looked up in the concurrent multi-reader, multi-writer cuckoo hash table, which returns the output port for each DMAC. Worker threads then distribute packets into the transmit (TX) queues associated with the corresponding output port.

In the third stage, NICs transmit the packets in the TX queues. For non-uniform memory architecture (NUMA) architecture platforms, to avoid contention and the overhead of synchronization, as well as to use the inter-NUMA domain bandwidth efficiently, an RX queue is created for each CPU core (corresponding to one worker thread), on each NIC in the same NUMA domain with this core.

Figure 11:
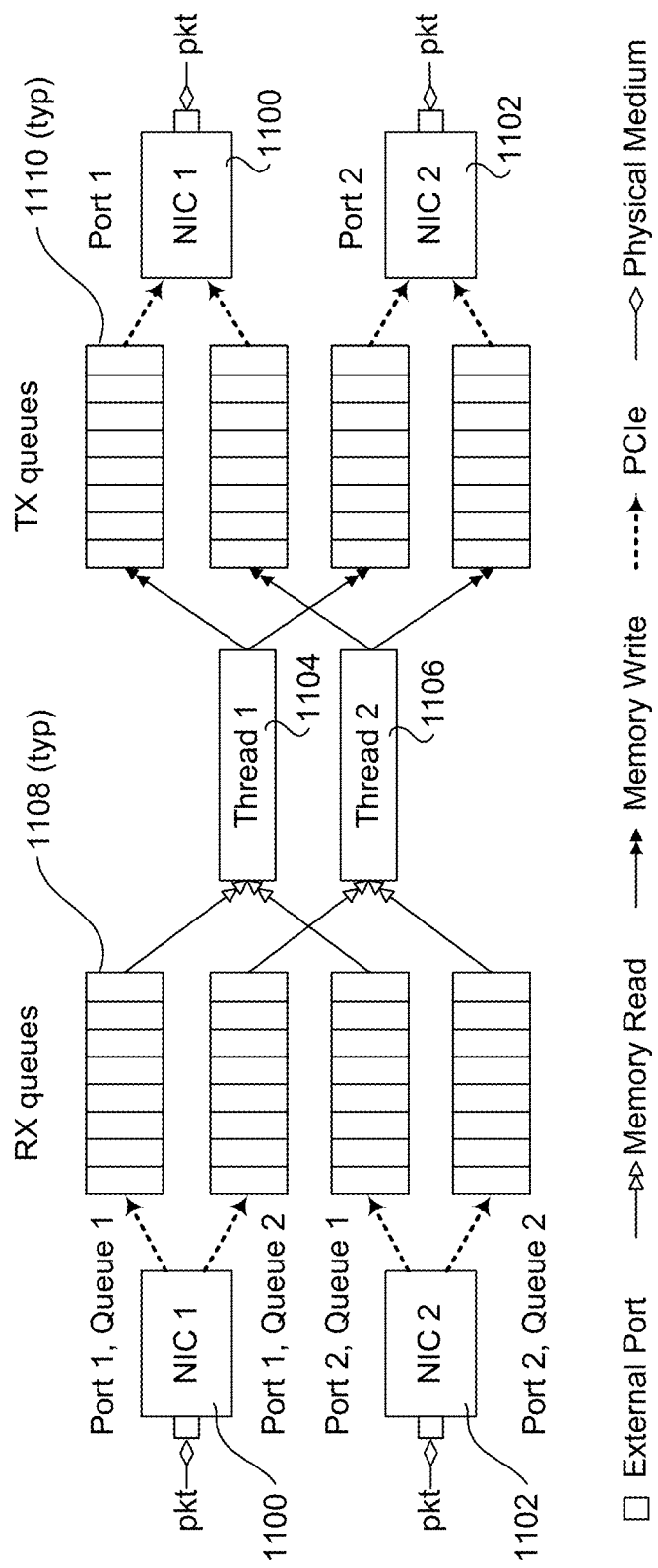
FIG. 11 is a schematic diagram illustrating a simplified implementation using two single-port NICs and two worker threads.

FIG. 11 illustrates a simplified implementation configuration with two single-port NICs 1100 (NIC 1) and 1102 (NIC 2) and two worker threads 1104 (Thread 1) and 1106 (Thread 2). Each port splits its incoming packets into two RX queues 1108, one for each thread. Two worker threads retrieve packets from the two RX queues associated with it and perform a DMAC lookup. The packets are then pushed by worker threads into TX queues 1110 based on the output port returned from the DMAC lookup.

For efficiency, the DPDK manages the packet queues to ensure that packets need not be copied (after the initial DMA) on the receive path. Using this setup, the only packet copy that must occur happens when copying the packet from an RX queue to an outbound TX queue.

Exemplary NUMA Platform

Figure 12:
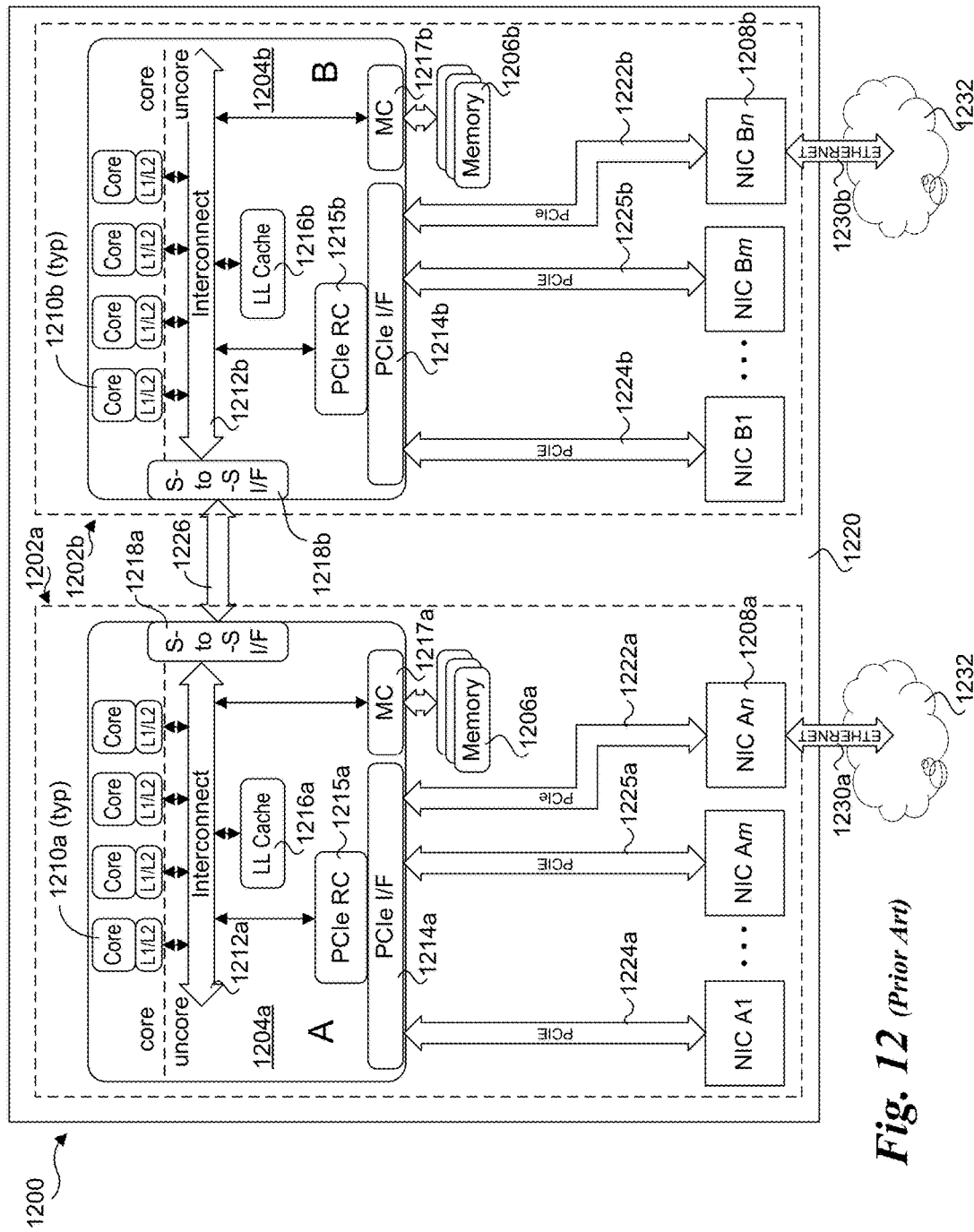
FIG. 12 is a schematic diagram of a NUMA platform architecture on which aspects of embodiments of the invention may be implemented.

As discussed above, in one embodiment aspects of the techniques described herein may be implemented on a platform employing a NUMA architecture. FIG. 12 illustrates one embodiment of a NUMA multi-processor platform architecture 1200 employing two NUMA nodes 1202a and 1202b, also labeled 'A' and 'B'. For simplicity and convenience, reference to nodes herein may be to their letter label rather than their reference number. In addition, reference to a component that is common across nodes will be made to the base reference number, while a letter 'a','b', will be added to the reference number in the drawing Figures to identify that component on a particular node. For example, each of nodes A and B include a processor 1204, which is labeled 1204a for the processor for node A and 1204b for the processor for node B.

In addition to a processor 1204, each node includes system memory 1206, and a plurality of NICs 1208. Each processor 1204 includes a core portion including a plurality of processor cores 1210, each including a local level 1 (L1) and level 2 (L2) cache. The remaining portion of the processor is referred to as the uncore, and includes various interconnect circuitry and interfaces for connecting various functional blocks on the processor in communication. For simplicity this interconnect circuitry is depicted as an interconnect 1212; however, it will be understood that interconnect 1212 may be representative of one or more interconnect structures, such as buses and single or multi-lane serial point-to-point or mesh interconnect structures, including interconnect hierarchies.

A portion of the uncore circuitry is configured to handle memory control and PCIe interfaces for devices such as NICs. Corresponding exemplary functional blocks depicted in the processor uncores in FIG. 12 include a PCIe interface (I/F) 1214, a PCIe Root Complex (RC) 1215, a last level cache (LL Cache) 1216, a memory controller (MC) 1217, and a socket-to-socket link interface (S-to-S I/F) 1218. In addition to these illustrated blocks, each processor 1204 would include many other functional blocks that are not shown for clarity.

Each of processors 1204 is operatively coupled to a printed circuit board called main board 1220 via a socket, or otherwise coupled to the main board via a direct coupling technique, such as flip-chip bonding. In either case, it is common practice to refer to the processors themselves as sockets, and thus the usage of the terminology socket-to-socket links and interfaces for coupling processor nodes in communication. Main board 1220 includes electrical wiring (e.g., traces and vias) to facilitate electrical connections corresponding to the physical structure of various interconnects depicted in FIG. 12. These interconnects include PCIe interconnects 1222, 1224, and 225 between PCIe interfaces 1214 and NICs 1208, and a socket-to-socket link 1226 coupled between socket-to-socket interfaces 1218a and 1218b. In one embodiment, socket-to-socket interfaces 1218a and 1218b employ one of an INTEL® QuickPath Interconnect (QPI)® protocol and wiring structure, an INTEL® Keizer Technology Interface or INTEL® Ultra-Path Interconnect (UPI).

Under a NUMA architecture, processors (and processor cores) are enabled to access different memory resources distributed across the platform. The memory resources may be considered local memory resources (e.g., memory resources on the same node as a processor or core) or non-local memory resources (e.g., memory resources on other nodes). For example, under the viewpoint of node 1202a, system memory 1206a comprises a local memory resource, while system memory 1206b comprises a non-local memory resource. Under another type of NUMA architecture (not depicted herein), non-local memory resources may also be shared between processors while not being associated with a particular processor or node. Since, for a given node, local memory resources are operatively coupled to a processor, while non-local memory resources are not, the access to the local memory resources relative to the non-local memory resources is not the same (e.g., the access is non-uniform). Moreover, it is preferable to employ local memory resources when available.

Under platform architecture 1200, software running on a processor core in one node may be allocated a memory address space in system memory nominally associated with another node. Accordingly, under some embodiments the address space for a portion of the memory resources for a platform may be managed as a single global pool, with unique addresses for each memory address location within the pool. Additionally, a portion of the address space may be considered local address space that employs local addressing (e.g., address space allocated to an operating system), while another portion may be addressed using global addressing. The use of a global pool enables flow table data to be shared across and distributed among the NUMA nodes.

Further aspects of the subject matter described herein are set out in the following numbered clauses:

1. A method for supporting multiple-writer and multiple-reader concurrency for packet flow data, comprising:
    implementing a flow table in memory of a host platform including multiple processor cores, the flow table including multiple rows, each row mapped to a respective hash bucket, each hash bucket containing one or more entry slots in which key data are stored;
    associating each bucket with a version counter, wherein a given version counter may be associated with one or more buckets;
    employing a plurality of threads, executing on the plurality of cores, to provide updates to data in the flow table, each thread comprising a writer;
    inserting new key data into the flow table, the insertion of the new key data requiring updates to key data in multiple buckets; and
    implementing an access mechanism that guarantees that only one writer can update any of the multiple buckets while the new key data is being inserted into the flow table.

2. The method of clause 1, further comprising:
    identifying multiple buckets that will include key data that will be updated in connection with inserting the new key data;
    acquiring update-rights to each of the multiple buckets before updating any of the multiple buckets; and
    updating key data in each of the multiple buckets to effect insertion of the new key data.

3. The method of clause 2, wherein acquiring update-rights to each of identified buckets includes use of a compare and swap (CAS) instruction.

4. The method of clause 3, wherein the CAS instruction comprises a compare and exchange instruction (CMPX-CHG) instruction.

5. The method of any of the preceding clauses, wherein the flow table is a cuckoo hash table with multiple entry slots for each bucket, further comprising determining a full cuckoo path that will be used to insert the new key data to identify the multiple buckets that include key data that will be updated in connection with inserting the new key data.

6. The method of any of the preceding clauses, further comprising:
    for each of the multiple buckets having key data that will be updated via insertion of the new key data,
    determining whether the current data in the bucket in being updated; and
    if the current data is not being updated, updating a count for the version counter associated with the bucket to indicate the current data in the bucket is in the process of being updated.

7. The method of clause 6, further comprising:
    determining that the current data for at least one of the buckets is not being updated;
    incrementing the version counter associated with said at least one of the buckets that is not being updated;
    subsequently determining that the current data in one of the buckets is being updated; and in response thereto;
    rolling back each of the version counters associated with said at least one of the buckets that is not being updated that was incremented.

8. The method of clause 7, wherein the operations are associated with a failed attempt to acquire update rights for each of the multiple buckets, the method further comprising:
    waiting a random time interval after the version counters have been rolled back; and
    re-attempting to acquire update-rights for each of the multiple buckets.

9. The method of clause 6, wherein updating a count for a version counter comprises incrementing a current counter value, further comprising:
    determining that update-rights for each of the multiple buckets has been acquired;
    updating key data in each of the multiple buckets, and in associate with the update for each bucket, incrementing the version counter associated with that bucket.

10. The method of any of the preceding clauses, wherein the host platform comprises a multi-socketed platform having a non-uniform memory access (NUMA) architecture.

11. The method of clause 1, further comprising:
identifying version counters that are associated with the multiple buckets; and
implementing an access mechanism that guarantees that only one writer can update any bucket that uses a version counter that is identified while the new key data is being inserted into the flow table.

12. The method of clause 1, further comprising:
identifying a version counter associated with a bucket having an entry containing existing key data to be modified; and
implementing an access mechanism that guarantees that only one writer can update any bucket that shares the same version counter that was identified while the existing key data is being modified.

13. One or more non-transient machine readable mediums, having instructions stored thereon configured to be executed on a host platform including a plurality of processor cores operatively coupled to system memory, wherein the instructions are configured, upon execution, to:
implement a flow table in a portion of the system memory, the flow table including multiple rows, each row mapped to a respective hash bucket, each hash bucket containing one or more entry slots in which key data are stored;
associate each bucket with a version counter, wherein a given version counter may be associated with one or buckets;
launch a plurality of threads, each comprising a writer or a reader, each writer configured to update data in the flow table and each reader configured to read data in the flow table;
insert, via the plurality of writers, new key data into the flow table, the insertion of the new key data requiring updates to key data in multiple buckets; and
enabling only a single writer to update any of the multiple buckets required for a given insertion of new key data while the new key data is being inserted into the flow table.

14. The one or more non-transient machine readable mediums of clause 13, wherein the instructions are further configured, upon execution, to:
identify multiple buckets that will include key data that will be updated in connection with inserting the new key data;
acquire update-rights to each of the multiple buckets before updating any of the multiple buckets; and
update key data in each of the multiple buckets to effect insertion of the new key data.

15. The one or more non-transient machine readable mediums of clause 14, wherein acquiring update-rights to each of identified buckets includes use of a compare and swap (CAS) instruction.

16. The one or more non-transient machine readable mediums of clause 15, wherein the CAS instruction comprises a compare and exchange instruction (CMPXCHG) instruction.

17. The one or more non-transient machine readable mediums of any of clauses 13-16, wherein the flow table is a cuckoo hash table with multiple entry slots for each bucket, wherein the instructions are further configured, upon execution, to determine a full cuckoo path that will be used to insert the new key data to identify the multiple buckets that include key data that will be updated in connection with inserting the new key data.

18. The one or more non-transient machine readable mediums of any of clauses 13-17, wherein the instructions are further configured, upon execution, to:
for each of the multiple buckets having key data that will be updated via insertion of the new key data,
determine whether the current data in the bucket in being updated; and
if the current data is not being updated, updating a count for the version counter associated with the bucket to indicate the current data in the bucket is in the process of being updated.

19. The one or more non-transient machine readable mediums of clause 18, wherein the instructions are further configured, upon execution, to:
determine that the current data for at least one of the buckets is not being updated;
increment the version counter associated with said at least one of the buckets that is not being updated;
subsequently determine that the current data in one of the buckets is being updated; and in response thereto;
roll back each of the version counters associated with said at least one of the buckets that is not being updated that was incremented.

20. The one or more non-transient machine readable mediums of clause 19, wherein the operations are associated with a failed attempt to acquire update rights for each of the multiple buckets, wherein the instructions are further configured, upon execution, to:
wait a random time interval after the version counters have been rolled back; and
re-attempt to acquire update-rights for each of the multiple buckets.

21. The one or more non-transient machine readable mediums of clause 18, wherein updating a count for a version counter comprises incrementing a current counter value, wherein the instructions are further configured, upon execution, to:
determine that update-rights for each of the multiple buckets has been acquired;
update key data in each of the multiple buckets, and in associate with the update for each bucket, incrementing the version counter associated with that bucket.

22. The one or more non-transient machine readable mediums of any of clauses 13-21, wherein the host platform comprises a multi-socketed platform having a non-uniform memory access (NUMA) architecture.

23. The one or more non-transient machine readable mediums of any of clauses 13-22, wherein the instructions are further configured, upon execution, to:
identify version counters that are associated with the multiple buckets; and
implement an access mechanism that guarantees that only one writer can update any bucket that uses a version counter that is identified while the new key data is being inserted into the flow table.

24. The one or more non-transient machine readable mediums of any of clauses 13-23, wherein the instructions are further configured, upon execution, to:
identify a version counter associated with a bucket having an entry containing existing key data to be modified; and
implement an access mechanism that guarantees that only one writer can update any bucket that shares the same version counter that was identified while the existing key data is being modified.

25. A host platform, comprising:
a first processor, having a plurality of processor cores;
system memory, operatively coupled to the first processor;
a plurality of Network Interface Controllers, each having one or more network ports; and
at least one storage device, having instructions stored therein configured to be executed on the plurality of processor cores, wherein execution of the instructions enables the host platform to,
implement a flow table using cuckoo hashing in a portion of the system memory, the flow table including multiple rows, each row mapped to a respective hash bucket, each hash bucket containing one or more entry slots used to store key data;
associate each bucket with a version counter, wherein a given version counter may be associated with one or buckets;
launch a plurality of threads, each comprising a writer or a reader, each writer configured to update data in the flow table and each reader configured to read data in the flow table;
insert, via the plurality of writers, new key data into the flow table, wherein for at least a portion of inserts of new key data, key data in a plurality of buckets along a cuckoo path are updated; and
enable only a single writer to update any of the multiple buckets along a given cuckoo path for a given insertion of new key data while the new key data is being inserted into the flow table, wherein multiple writers are enabled to currently perform inserts of new key data.

26. The host platform of clause 25, wherein the instructions are further configured, upon execution, to facilitate insertion of new key data by:
identifying multiple buckets along a cuckoo path for the new key data, wherein the first bucket is identified via one of a first and second hash function;
acquiring update-rights to each of the multiple buckets along the cuckoo path before updating any of the multiple buckets; and
updating key data in each of the multiple buckets along the cuckoo path to effect insertion of the new key data.

27. The host platform of clause 26, wherein the instructions are further configured, upon execution, to:
for each of the multiple buckets along the cuckoo path,
determine whether the current data in the bucket in being updated; and
if the current data is not being updated, incrementing a count for the version counter associated with the bucket to indicate the current data in the bucket is in the process of being updated.

28. The host platform of clause 27, wherein the instructions are further configured, upon execution, to:
determine that the current data for at least one of the buckets is not being updated;
increment the version counter associated with said at least one of the buckets that is not being updated;
subsequently determine that the current data in one of the buckets is being updated; and in response thereto;
roll back each of the version counters associated with said at least one of the buckets that is not being updated that was incremented.

29. The host platform of clause 28, wherein the operations are associated with a failed attempt to acquire update rights for each of the multiple buckets, wherein the instructions are further configured, upon execution, to:
wait a random time interval after the version counters have been rolled back; and
re-attempt to acquire update-rights for each of the multiple buckets.

30. The host platform of clause 27, wherein updating a count for a version counter comprises incrementing a current counter value, wherein the instructions are further configured, upon execution, to:
determine that update-rights for each of the multiple buckets has been acquired;
update key data in each of the multiple buckets, and in associate with the update for each bucket, incrementing the version counter associated with that bucket.

31. The host platform of any of clauses 25-30, wherein the instructions are further configured, upon execution, to:
identify version counters that are associated with the multiple buckets; and
implement an access mechanism that guarantees that only one writer can update any bucket that uses a version counter that is identified while the new key data is being inserted into the flow table.

32. The one or more non-transient machine readable mediums of any of clauses 25-31, wherein the instructions are further configured, upon execution, to:
identify a version counter associated with a bucket having an entry containing existing key data to be modified; and
implement an access mechanism that guarantees that only one writer can update any bucket that shares the same version counter that was identified while the existing key data is being modified.

33. The host platform of any of clauses 25-32, wherein the system memory comprises a first portion of system memory, further comprising;
a second processor, having a plurality of processor cores, coupled to the first processor via a processor-to-processor interconnect;
a second portion of system memory; operatively coupled to the second processor,
wherein the host platform employs a non-uniform memory access (NUMA) architecture that enables each of the first and second processors to access each of the first and second portions of memory, and wherein respective portions of the flow table are stored in the first and second portions of system memories.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the terminology "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for supporting multiple-writer and multiple-reader concurrency for packet flow data, comprising:
implementing a flow table in memory of a host platform including multiple processor cores, the flow table including multiple rows, each row mapped to a respective hash bucket, each hash bucket containing one or more entry slots in which key data are stored;
enabling concurrent read access to the flow table from multiple readers; and
enabling concurrent write access to the flow table from multiple writers by,
associating each bucket with a version counter, wherein a given version counter is associated with one or more buckets;
employing a plurality of threads, executing on the plurality of cores, to concurrently update data in the flow table, each thread comprising a writer;
inserting new key data into the flow table, the insertion of the new key data requiring updates to key data in multiple buckets; and
implementing an access mechanism that guarantees that only one writer can update any of the multiple buckets while the new key data is being inserted into the flow table,
wherein while the single writer is updating the multiple buckets required for a given insertion of new key data one or more other writers are enabled to concurrently insert new key data in the flow table by updating one or more buckets that are not among the multiple buckets being updated by the single writer.

2. The method of claim 1, further comprising:
identifying multiple buckets that will include key data that will be updated in connection with inserting the new key data;

acquiring update-rights to each of the multiple buckets before updating any of the multiple buckets; and updating key data in each of the multiple buckets to effect insertion of the new key data.

3. The method of claim 2, wherein acquiring update-rights to each of identified buckets includes use of a compare and swap (CAS) instruction.

4. The method of claim 3, wherein the CAS instruction comprises a compare and exchange instruction (CMPX-CHG) instruction.

5. The method of claim 1, wherein the flow table is a cuckoo hash table with multiple entry slots for each bucket, further comprising determining a full cuckoo path that will be used to insert the new key data to identify the multiple buckets that include key data that will be updated in connection with inserting the new key data.

6. The method of claim 1, further comprising:

for each of the multiple buckets having key data that will be updated via insertion of the new key data, determining whether the current data in the bucket is being updated; and if the current data is not being updated, updating a count for the version counter associated with the bucket to indicate the current data in the bucket is in the process of being updated.

7. The method of claim 6, further comprising:

determining that the current data for at least one of the buckets is not being updated;

incrementing the version counter associated with said at least one of the buckets that is not being updated;

subsequently determining that the current data in one of the buckets is being updated; and in response thereto;

rolling back each of the version counters associated with said at least one of the buckets that is not being updated that was incremented.

8. The method of claim 7, wherein the operations are associated with a failed attempt to acquire update rights for each of the multiple buckets, the method further comprising:

waiting a random time interval after the version counters have been rolled back; and re-attempting to acquire update-rights for each of the multiple buckets.

9. The method of claim 6, wherein updating a count for a version counter comprises incrementing a current counter value, further comprising:

determining that update-rights for each of the multiple buckets has been acquired;

updating key data in each of the multiple buckets, and in associate with the update for each bucket, incrementing the version counter associated with that bucket.

10. The method of claim 1, wherein the host platform comprises a multi-socketed platform having a non-uniform memory access (NUMA) architecture.

11. The method of claim 1, wherein the plurality of readers are enabled to concurrently read key data in the flow table and the plurality of writers are enabled to concurrently update key data in the flow table without use of mutexes or locks.

12. One or more non-transient machine readable mediums, having instructions stored thereon configured to be executed on a host platform including a plurality of processor cores operatively coupled to system memory, wherein the instructions are configured, upon execution, to:

implement a flow table in a portion of the system memory, the flow table including multiple rows, each row mapped to a respective hash bucket, each hash bucket containing one or more entry slots in which key data are stored;

associate each bucket with a version counter, wherein a given version counter is associated with one or more buckets;

launch a plurality of threads, each comprising a writer or a reader, the plurality of threads including each of a plurality of writers and a plurality of readers, each writer configured to update data in the flow table and each reader configured to read data in the flow table;

enable the plurality of readers to concurrently read key data in the flow table; and enable the plurality of writers to concurrently update key data in the flow table by, inserting, via the plurality of writers, new key data into the flow table, the insertion of at least some of the new key data requiring updates to key data in multiple buckets; and enabling only a single writer to update any of the multiple buckets required for a given insertion of new key data while the new key data is being inserted into the flow table, wherein while the single writer is updating the multiple buckets required for a given insertion of new key data one or more other writers are enabled to concurrently insert new key data in the flow table by updating one or more buckets that are not among the multiple buckets being updated by the single writer.

13. The one or more non-transient machine readable mediums of claim 12, wherein the instructions are further configured, upon execution, to:

identify multiple buckets that will include key data that will be updated in connection with inserting the new key data;

acquire update-rights to each of the multiple buckets before updating any of the multiple buckets; and update key data in each of the multiple buckets to effect insertion of the new key data.

14. The one or more non-transient machine readable mediums of claim 13, wherein acquiring update-rights to each of identified buckets includes use of a compare and swap (CAS) instruction.

15. The one or more non-transient machine readable mediums of claim 14, wherein the CAS instruction comprises a compare and exchange instruction (CMPXCHG) instruction.

16. The one or more non-transient machine readable mediums of claim 12, wherein the flow table is a cuckoo hash table with multiple entry slots for each bucket, wherein the instructions are further configured, upon execution, to determine a full cuckoo path that will be used to insert the new key data to identify the multiple buckets that include key data that will be updated in connection with inserting the new key data.

17. The one or more non-transient machine readable mediums of claim 12, wherein the instructions are further configured, upon execution, to:

for each of the multiple buckets having key data that will be updated via insertion of the new key data, determine whether the current data in the bucket in being updated; and if the current data is not being updated, updating a count for the version counter associated with the bucket to indicate the current data in the bucket is in the process of being updated.

18. The one or more non-transient machine readable mediums of claim 17, wherein the instructions are further configured, upon execution, to:
determine that the current data for at least one of the buckets is not being updated;
increment the version counter associated with said at least one of the buckets that is not being updated;
subsequently determine that the current data in one of the buckets is being updated; and in response thereto;
roll back each of the version counters associated with said at least one of the buckets that is not being updated that was incremented.

19. The one or more non-transient machine readable mediums of claim 18, wherein the operations are associated with a failed attempt to acquire update rights for each of the multiple buckets, wherein the instructions are further configured, upon execution, to:
wait a random time interval after the version counters have been rolled back; and
re-attempt to acquire update-rights for each of the multiple buckets.

20. The one or more non-transient machine readable mediums of claim 17, wherein updating a count for a version counter comprises incrementing a current counter value, wherein the instructions are further configured, upon execution, to:
determine that update-rights for each of the multiple buckets has been acquired;
update key data in each of the multiple buckets, and in associate with the update for each bucket, incrementing the version counter associated with that bucket.

21. The one or more non-transient machine readable mediums of claim 12, wherein the host platform comprises a multi-socketed platform having a non-uniform memory access (NUMA) architecture.

22. The one or more non-transient machine readable mediums of claim 12, wherein the plurality of readers are enabled to concurrently read key data in the flow table and the plurality of writers are enabled to concurrently update key data in the flow table without use of mutexes or locks.

23. A host platform, comprising:
a first processor, having a plurality of processor cores;
system memory, operatively coupled to the first processor;
a plurality of Network Interface Controllers, each having one or more network ports; and
at least one storage device, having instructions stored therein configured to be executed on the plurality of processor cores, wherein execution of the instructions enables the host platform to,
implement a flow table using cuckoo hashing in a portion of the system memory, the flow table including multiple rows, each row mapped to a respective hash bucket, each hash bucket containing one or more entry slots used to store key data;
associate each bucket with a version counter, wherein a given version counter is associated with one or buckets;
launch a plurality of threads, each comprising a writer or a reader, the plurality of threads including each of a plurality of writers and a plurality of readers, each writer configured to update data in the flow table and each reader configured to read data in the flow table, wherein the plurality of readers are enabled to concurrently read key data in the flow table;
insert, via the plurality of writers, new key data into the flow table, wherein for at least a portion of inserts of new key data, key data in a plurality of buckets along a cuckoo path are updated; and
enable only a single writer to update any of the multiple buckets along a given cuckoo path for a given insertion of new key data while the new key data is being inserted into the flow table,
wherein while the single writer is updating the multiple buckets required for a given insertion of new key data one or more other writers are enabled to concurrently insert new key data in the flow table by updating one or more buckets that are not among the multiple buckets being updated by the single writer.

24. The host platform of claim 23, wherein the instructions are further configured, upon execution, to facilitate insertion of new key data by:
identifying multiple buckets along a cuckoo path for the new key data, wherein the first bucket is identified via one of a first and second hash function;
acquiring update-rights to each of the multiple buckets along the cuckoo path before updating any of the multiple buckets; and
updating key data in each of the multiple buckets along the cuckoo path to effect insertion of the new key data.

25. The host platform of claim 24, wherein the instructions are further configured, upon execution, to:
for each of the multiple buckets along the cuckoo path, determine whether the current data in the bucket is being updated; and
if the current data is not being updated, incrementing a count for the version counter associated with the bucket to indicate the current data in the bucket is in the process of being updated.

26. The host platform of claim 25, wherein the instructions are further configured, upon execution, to:
determine that the current data for at least one of the buckets is not being updated;
increment the version counter associated with said at least one of the buckets that is not being updated;
subsequently determine that the current data in one of the buckets is being updated; and in response thereto;
roll back each of the version counters associated with said at least one of the buckets that is not being updated that was incremented.

27. The host platform of claim 23, wherein the system memory comprises a first portion of system memory, further comprising;
a second processor, having a plurality of processor cores, coupled to the first processor via a processor-to-processor interconnect;
a second portion of system memory; operatively coupled to the second processor,
wherein the host platform employs a non-uniform memory access (NUMA) architecture that enables each of the first and second processors to access each of the first and second portions of memory, and wherein respective portions of the flow table are stored in the first and second portions of system memories.

28. The host platform of claim 23, wherein the multiple writers are enabled to currently perform inserts of new key data and the multiple readers are enabled to concurrently read key data from the flow table without use of mutexes or locks.

* * * * *